US010066077B2

(12) United States Patent
Kunimoto et al.

(10) Patent No.: US 10,066,077 B2
(45) Date of Patent: Sep. 4, 2018

(54) CROSSLINKABLE FLUORINATED ELASTOMER COMPOSITION AND CROSSLINKED PRODUCT THEREOF

(71) Applicant: Asahi Glass Company, Limited, Chiyoda-ku (JP)

(72) Inventors: Akinobu Kunimoto, Chiyoda-ku (JP); Hiromasa Yamamoto, Chiyoda-ku (JP); Norihide Sugiyama, Chiyoda-ku (JP); Takeshi Yamada, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 77 days.

(21) Appl. No.: 15/007,690

(22) Filed: Jan. 27, 2016

(65) Prior Publication Data
US 2016/0137809 A1 May 19, 2016

Related U.S. Application Data

(63) Continuation of application No. PCT/JP2014/070493, filed on Aug. 4, 2014.

(30) Foreign Application Priority Data

Aug. 7, 2013 (JP) ................. 2013-164620
Dec. 4, 2013 (JP) ................. 2013-251241

(51) Int. Cl.
*C08K 5/06* (2006.01)
*C08K 5/00* (2006.01)

(52) U.S. Cl.
CPC .............. *C08K 5/06* (2013.01); *C08K 5/0025* (2013.01)

(58) Field of Classification Search
CPC . C08K 5/06; C08L 27/12; C08L 27/18; C08L 27/20
USPC ........................................ 525/123
See application file for complete search history.

(56) References Cited

U.S. PATENT DOCUMENTS

| 3,293,305 | A | * | 12/1966 | Haszeldine | ........... C07C 17/093 |
| | | | | | 252/73 |
| 3,358,040 | A | * | 12/1967 | McMahon, Jr. | ........ C07C 43/29 |
| | | | | | 508/581 |
| 3,853,828 | A | | 12/1974 | Wall et al. | |
| 4,035,565 | A | | 7/1977 | Apotheker et al. | |
| 4,243,770 | A | * | 1/1981 | Tatemoto | ................. C08F 8/18 |
| | | | | | 525/326.3 |
| 4,394,489 | A | | 7/1983 | Aufdermarsh | |
| 4,446,270 | A | * | 5/1984 | Guenthner | ............ C08F 259/08 |
| | | | | | 524/433 |
| 7,892,720 | B2 | * | 2/2011 | Eriguchi | ............... G03F 7/0046 |
| | | | | | 430/270.1 |
| 2004/0116611 | A1 | | 6/2004 | Hung | |
| 2004/0127632 | A1 | * | 7/2004 | Kim | ...................... C07C 43/225 |
| | | | | | 524/544 |
| 2005/0171257 | A1 | | 8/2005 | Wakui | |
| 2006/0047084 | A1 | | 3/2006 | Funaki et al. | |
| 2009/0017265 | A1 | * | 1/2009 | Eriguchi | ............... G03F 7/0046 |
| | | | | | 428/172 |
| 2009/0023863 | A1 | | 1/2009 | Kanega et al. | |
| 2010/0172623 | A1 | | 7/2010 | Park et al. | |
| 2016/0137572 | A1 | * | 5/2016 | Yamamoto | .............. C07C 43/29 |
| | | | | | 526/247 |

FOREIGN PATENT DOCUMENTS

| EP | 0 842 160 A1 | 5/1998 |
| JP | 1-193349 | 8/1989 |
| JP | 2000-327846 | 11/2000 |
| JP | 2005-220161 | 8/2005 |
| JP | 4730436 | 7/2011 |
| JP | 5057657 | 10/2012 |
| JP | 5245378 | 7/2013 |
| WO | WO 90/14367 | 11/1990 |
| WO | WO 2006/038424 A1 | 4/2006 |

OTHER PUBLICATIONS

English Translation of International Search Report dated Nov. 4, 2014 in PCT/JP2014/070493, filed Aug. 4, 2014.

* cited by examiner

*Primary Examiner* — Michael M Dollinger
(74) *Attorney, Agent, or Firm* — Oblon, McClelland, Maier & Neustadt, L.L.P.

(57) ABSTRACT

To provide a crosslinkable fluorinated elastomer composition which is excellent in crosslinking reactivity and of which a crosslinked product is excellent in heat resistance and chemical resistance. The crosslinkable fluorinated elastomer composition comprises a fluorinated elastomer (e.g. a tetrafluoroethylene/perfluoro(alkyl vinyl ether) copolymer) and an aromatic compound having at least two crosslinkable unsaturated double bonds (e.g. a compound represented by the formula (A-1)), and the crosslinked product is one obtained by crosslinking the crosslinkable fluorinated elastomer composition.

15 Claims, No Drawings

CROSSLINKABLE FLUORINATED ELASTOMER COMPOSITION AND CROSSLINKED PRODUCT THEREOF

This application is a continuation of PCT Application No. PCT/JP2014/070493, filed on Aug. 4, 2014, which is based upon and claims the benefit of priority from Japanese Patent Application No. 2013-164620 filed on Aug. 7, 2013 and Japanese Patent Application No. 2013-251241 filed on Dec. 4, 2013. The contents of those applications are incorporated herein by reference in their entireties.

TECHNICAL FIELD

The present invention relates to a crosslinkable fluorinated elastomer composition and a crosslinked product thereof.

BACKGROUND ART

A method for crosslinking a fluorinated elastomer is known to influence the properties of the resulting crosslinked product. In particular, a perfluoroelastomer is known to be not easy to crosslink. Therefore, various crosslinking methods have been proposed to improve the properties of crosslinked products or to improve crosslinking reactivities.

For example, the following methods have been proposed as methods for crosslinking a perfluoroelastomer.

(1) a crosslinking method wherein a perfluoroelastomer having nitrile groups as crosslinking sites, is reacted in the presence of an organic tin compound, to form a triazine ring from three nitrile groups (Patent Document 1).

(2) a crosslinking method wherein a perfluoroelastomer having a bromine atom as a crosslinking site, is reacted with triallyl isocyanurate (hereinafter referred to also as TAIC) as a crosslinking aid, in the presence of a peroxide (Patent Document 2).

(3) a crosslinking method wherein a perfluoroelastomer having an iodine atom as a crosslinking site at a polymer chain terminal, is reacted with TAIC in the presence of a peroxide (Patent Documents 3 and 4).

(4) a crosslinking method wherein a perfluoroelastomer having an iodine atom at a polymer chain terminal, is reacted with 1,6-divinyl perfluorohexane as a crosslinking aid in the presence of a peroxide (Patent Document 5).

However, the crosslinked product obtained by the method of (1) is not sufficient in chemical resistance, particularly in amine resistance.

The crosslinked product obtained by the method of (2) or (3) has a crosslinking point of an isocyanurate ring and thus is not sufficiently heat resistant.

The crosslinked product obtained by the method of (4) is excellent in heat resistance, but is not sufficient in chemical resistance, particularly in amine resistance.

Therefore, development of a perfluoroelastomer composition which is excellent in crosslinking reactivity and of which a crosslinked product is excellent in chemical resistance and heat resistance, is desired.

PRIOR ART DOCUMENTS

Patent Documents

Patent Document 1: U.S. Pat. No. 4,394,489
Patent Document 2: U.S. Pat. No. 4,035,565
Patent Document 3: U.S. Pat. No. 4,243,770
Patent Document 4: WO90/014367
Patent Document 5: Japanese Patent No. 5,057,657

DISCLOSURE OF INVENTION

Technical Problem

It is an object of the present invention is to provide a crosslinkable fluorinated elastomer composition which is excellent in crosslinking reactivity and of which a crosslinked product is excellent in heat resistance and chemical resistance, and to provide a crosslinked product thereof.

Solution to Problem

The present invention provides a crosslinkable fluorinated elastomer composition and a crosslinked product thereof, having the following constructions [1] to [17].

[1] A crosslinkable fluorinated elastomer composition, characterized by comprising a fluorinated elastomer and an aromatic compound having at least two crosslinkable unsaturated double bonds.

[2] The crosslinkable fluorinated elastomer composition according to [1], wherein the aromatic compound having at least two crosslinkable unsaturated double bonds, has at least two vinyl groups or allyl groups bonded to an aromatic ring.

[3] The crosslinkable fluorinated elastomer composition according to [1] or [2], wherein the aromatic compound having at least two crosslinkable unsaturated double bonds, comprises either one or both of a fluorinated aromatic compound having at least two of group (1) represented by the following formula (1) and an aromatic hydrocarbon having at least two vinyl groups bonded to an aromatic ring:

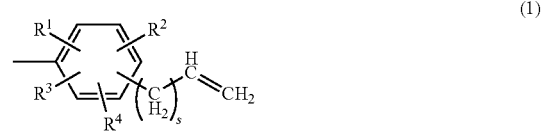

(1)

wherein s is 0 or 1, and each of $R^1$, $R^2$, $R^3$ and $R^4$ which are independent of one another, is a hydrogen atom or a fluorine atom.

[4] The crosslinkable fluorinated elastomer composition according to [3], wherein the fluorinated aromatic compound comprises a fluorinated aromatic compound having at least two of said group (1), and the fluorinated aromatic compound having at least two of said group (1) comprises either one or both a fluorinated aromatic compound (A) represented by the following formula (A) and a fluorinated aromatic compound (B) having said group (1) and an ether bond, obtained by subjecting a fluorinated aromatic compound (x) represented by the following formula (x), either one or both of an aromatic compound (y1) having said group (1) and a phenolic hydroxy group and an aromatic compound (y2) having said group (1) and a fluorine atom substituting an aromatic ring, and an aromatic compound (z) having at least three phenolic hydroxy groups, to a condensation reaction in the presence of a HF elimination agent:

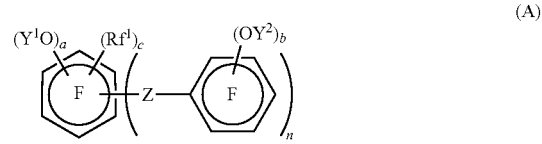

(A)

wherein, n is an integer of from 0 to 6, a is an integer from 0 to 5, b is an integer of from 0 to 4, c is an integer of from 0 to 4, a+c+n is from 2 to 6, a+b is from 2 to 9, Z is a single bond, —O—, —S—, —CO—, —C(CH$_3$)$_2$—, —C(CF$_3$)$_2$—, —SO— or —SO$_2$—, Rf$^1$ is a C$_{1-8}$ fluoroalkyl group, each of Y$^1$ and Y$^2$ which are independent of each other, is said group (1), and F in the aromatic ring represents that hydrogen atoms of the aromatic ring are all substituted by fluorine atoms,

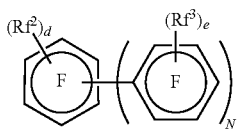

(x)

wherein N is an integer of from 0 to 3, each of d and e which are independent of each other, is an integer of from 0 to 3, each of Rf$^2$ and Rf$^3$ which are independent of each other, is a C$_{1-8}$ fluoroalkyl group, and F in the aromatic ring represents that hydrogen atoms of the aromatic ring are all substituted by fluorine atoms.

[5] The crosslinkable fluorinated elastomer composition according to [4], wherein the fluorinated aromatic compound (x) is at least one member selected from the group consisting of perfluorobenzene, perfluorotoluene, perfluoroxylene, perfluorobiphenyl, perfluoroterphenyl, a perfluorotriphenyl benzene, a perfluorotetraphenyl benzene, a perfluoropentaphenyl benzene and a perfluorohexaphenylbenzene.

[6] The crosslinkable fluorinated elastomer composition according to [4] or [5], wherein the aromatic compound (z) is at least one member selected from the group consisting of trihydroxybenzene, trihydroxybiphenyl, trihydroxynaphthalene, 1,1,1-tris(4-hydroxyphenyl)ethane, tris(4-hydroxyphenyl)benzene, tetrahydroxybenzene, tetrahydroxybiphenyl, tetrahydroxybinaphthyl and a tetrahydroxyspiroindane.

[7] The crosslinkable fluorinated elastomer composition according to [4], wherein the fluorinated aromatic compound (A) is one which satisfies both conditions that each of R$^1$, R$^2$, R$^3$ and R$^4$ in Y$^1$ and Y$^2$ in the formula (A) is a hydrogen atom, and that in the formula (A), c is 0, or c is an integer of from 1 to 4 and Rf$^1$ is a C$_{1-8}$ perfluoroalkyl group.

[8] The crosslinkable fluorinated elastomer composition according to [7], wherein the fluorinated aromatic compound (A) is a compound represented by the following formula (A-1) or (A-2):

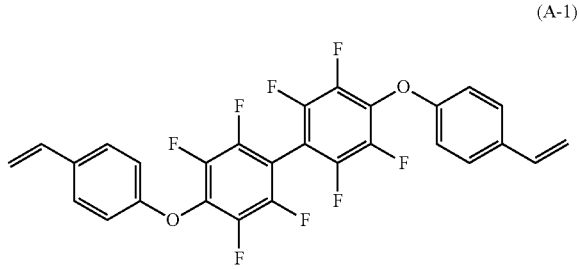

(A-1)

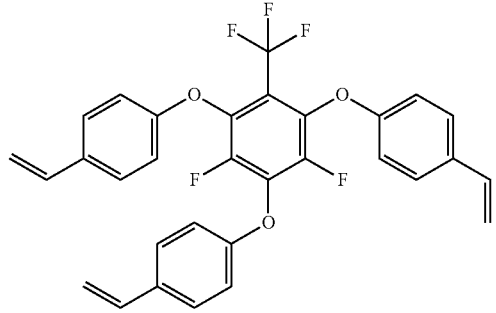

(A-2)

[9] The crosslinkable fluorinated elastomer composition according to any of [1] to [8], wherein the content of the aromatic compound having at least two crosslinkable unsaturated double bonds, is from 0.1 to 15 mass % based on the mass of the fluorinated elastomer.

[10] The crosslinkable fluorinated elastomer composition according to any one of [1] to [9], which further contains an organic peroxide, and wherein the content of the organic peroxide is from 0.1 to 5 mass % based on the mass of the fluorinated elastomer.

[11] The crosslinkable fluorinated elastomer composition according to any one of [1] to [10], wherein the fluorinated elastomer contains iodine and/or bromine atoms.

[12] The crosslinkable fluorinated elastomer composition according to any one of [1] to [11], wherein the fluorinated elastomer is a perfluoroelastomer.

[13] The crosslinkable fluorinated elastomer composition according to any one of [1] to [12], wherein the fluorinated elastomer is a tetrafluoroethylene/perfluoro(alkyl vinyl ether) copolymer having an iodine atom at a polymer chain terminal.

[14] The crosslinkable fluorinated elastomer composition according to any one of [1] to [13], which further contains a crosslinking aid other than the aromatic compound having at least two crosslinkable unsaturated double bonds, and wherein the content of the crosslinking aid is from 0.1 to 3 mass % based on the mass of the fluorinated elastomer.

[15] The crosslinkable fluorinated elastomer composition according to [14], wherein the mass ratio of the aromatic compound having at least two crosslinkable unsaturated double bonds/the crosslinking aid other than the aromatic compound is from 1/30 to 150/1.

[16] The crosslinkable fluorinated elastomer composition according to [14] or [15], wherein the crosslinking aid other than the aromatic compound having at least two crosslinkable unsaturated double bonds is triallyl isocyanurate.

[17] A crosslinked product obtained by crosslinking the crosslinkable fluorinated elastomer composition as defined in any one of [1] to [16].

Advantageous Effects of Invention

The crosslinkable fluorinated elastomer composition of the present invention is excellent in crosslinking reactivity, and its crosslinked product is excellent in heat resistance and chemical resistance. The crosslinked product of the present invention is excellent in heat resistance and chemical resistance.

DESCRIPTION OF EMBODIMENTS

[Crosslinkable Fluorinated Elastomer Composition]

The crosslinkable fluorinated elastomer composition of the present invention is characterized by comprising a fluorinated elastomer and an aromatic compound having at least two crosslinkable unsaturated double bonds (hereinafter referred to also as a crosslinkable aromatic compound).
(Crosslinkable Aromatic Compound)

In the present invention, an aromatic compound is a compound having an aromatic ring.

The aromatic ring may, for example, be a benzene ring, a condensed ring containing a benzene ring (such as a naphthalene ring, an anthracene ring, phenanthrene or pyrene), or an aromatic polycyclic ring including biphenyl.

The content of crosslinkable unsaturated double bonds in the crosslinkable aromatic compound is preferably from 1 to 20 mmol, more preferably from 3 to 10 mmol, per 1 g of the crosslinkable aromatic compound.

The crosslinkable aromatic compound may be an aromatic compound having at least two functional groups each containing a crosslinkable unsaturated double bond (hereinafter referred to also as crosslinkable functional groups).

Such a crosslinkable functional group may, for example, be a vinyl group (referred to also as an ethenyl group), an allyl group, a (meth)acryloyl group, a (meth)acryloyloxy group, a vinyloxy group, a trifluorovinyl group, a trifluorovinyloxy group, or a cyclic crosslinkable functional group, such as a cyclopropenyl group, a cyclobutenyl group or a cyclopentadienyl group. The "(meth) acryloyl" refers to acryloyl or methacryloyl.

The crosslinkable functional groups in the crosslinkable aromatic compound may be of one type, or of two or more types.

The crosslinkable aromatic compound is preferably one having at least two vinyl groups or allyl groups bonded to an aromatic ring, more preferably one having group(s) (1) represented by the following formula (1), from the viewpoint of the crosslinking reactivity of the crosslinkable fluorinated elastomer composition, the heat resistance and chemical resistance of its crosslinked product, availability of raw materials and production costs, etc.

The number of group (1) in the crosslinkable aromatic compound, may be one or more. When the crosslinkable aromatic compound group has only one group (1), it further has at least one crosslinkable functional group of another type.

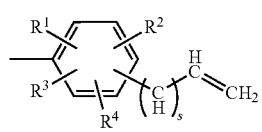

(1)

In the formula, s is 0 or 1, and each of $R^1$, $R^2$, $R^3$ and $R^4$ which are independent of one another, is a hydrogen atom or a fluorine atom.

In the formula (1), s is preferably 0, from the viewpoint of excellent crosslinking reactivity.

Further, from the viewpoint of excellent crosslinking reactivity, at least one among $R^1$, $R^2$, $R^3$ and $R^4$, is preferably a hydrogen atom, and it is particularly preferred that each of $R^1$, $R^2$, $R^3$ and $R^4$ is a hydrogen atom. Among $R^1$, $R^2$, $R^3$ and $R^4$, as the number of those which are hydrogen atoms increases, crosslinkability of the crosslinkable fluorinated elastomer composition becomes better. Heretofore, if a crosslinking aid to be used for crosslinking a fluorinated elastomer contained hydrogen atoms, a crosslinked product tended to be insufficient in heat resistance in some cases. In the present invention, even if the crosslinkable aromatic compound contains hydrogen atoms, the crosslinked product is excellent in heat resistance.

Specific examples of the group (1) include a vinyl-substituted phenyl group, an allyl-substituted phenyl group, etc. A vinyl-substituted phenyl group is preferred, in that the crosslinking reactivity is high, and a high crosslinking density is thereby obtainable.

The crosslinkable aromatic compound preferably comprises either one or both of a fluorinated aromatic compound having at least two of group (1) and an aromatic hydrocarbon having at least two vinyl groups bonded to an aromatic ring.

Such a fluorinated aromatic compound preferably comprises either one or both of the following fluorinated aromatic compound (A) and fluorinated aromatic compound (B).

Fluorinated aromatic compound (A): a fluorinated aromatic compound represented by the following formula (A).

Fluorinated aromatic compound (B): a fluorinated aromatic compound having said group (1) and an ether bond, obtained by subjecting a fluorinated aromatic compound (x) represented by the following formula (x), either one or both of an aromatic compound (y1) having said group (1) and a phenolic hydroxy group and an aromatic compound (y2) having said group (1) and a fluorine atom substituting an aromatic ring, and a compound (z) having at least three phenolic hydroxy groups, to a condensation reaction in the presence of a HF elimination agent:

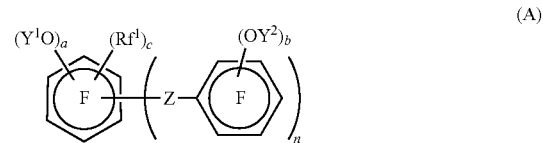

(A)

wherein, n is an integer of from 0 to 6, a is an integer from 0 to 5, b is an integer of from 0 to 4, c is an integer of from 0 to 4, a+c+n is from 2 to 6, a+b is from 2 to 9, Z is a single bond, —O—, —S—, —CO—, —C(CH$_3$)$_2$—, —C(CF$_3$)$_2$—, —SO— or —SO$_2$—, Rf$^1$ is a C$_{1-8}$ fluoroalkyl group, each of Y$^1$ and Y$^2$ which are independent of each other, is said group (1), and F in the aromatic ring represents that hydrogen atoms of the aromatic ring are all substituted by fluorine atoms,

(x)

wherein N is an integer of from 0 to 3, each of d and e which are independent of each other, is an integer of from 0 to 3, each of Rf$^2$ and Rf$^3$ which are independent of each other, is a C$_{1-8}$ fluoroalkyl group, and F in the aromatic ring represents that hydrogen atoms of the aromatic ring are all substituted by fluorine atoms.

Now, the fluorinated aromatic compound (A), the fluorinated aromatic compound (B), and the aromatic hydrocarbon having at least two vinyl groups bonded to an aromatic ring (hereinafter referred to also as the aromatic hydrocarbon (C)), will be described in detail, respectively.

[Fluorinated Aromatic Compound (A)]

In the formula (A), n is preferably from 0 to 4, more preferably from 0 to 3.

a is preferably from 1 to 3, more preferably from 1 to 2.

b is preferably from 1 to 3, more preferably from 1 to 2.

c is preferably 0 or 1, more preferably 0.

a+c+n is preferably from 2 to 4. a+b is preferably from 2 to 6.

Z is preferably a single bond, —O— or —S—, more preferably a single bond or —O—.

The number of carbon atoms in the fluoroalkyl group for $Rf^1$ is preferably from 1 to 6, more preferably from 1 to 4, most preferably 1. As the fluoroalkyl group, a perfluoroalkyl group is preferred, since it is excellent in heat resistance. Specific examples thereof include a perfluoromethyl group, a perfluoroethyl group, a perfluoropropyl group, a perfluorobutyl group, a perfluorohexyl group, a perfluorooctyl group, etc. A perfluoromethyl group is most preferred as $Rf^1$.

The description of the group (1) in $Y^1$ and $Y^2$ is the same as described above.

In the formula (A), $Y^1$ and $Y^2$ may be the same or different and are preferably the same.

The molecular weight of the fluorinated aromatic compound (A) is preferably from 300 to 2,000, more preferably from 350 to 1,000. When the molecular weight is within this range, the crosslinkable fluorinated elastomer composition becomes to have a higher crosslinking reactivity, and its crosslinked product is likely to be further excellent in heat resistance and chemical resistance.

From the viewpoint of excellent effects of the present invention, the fluorinated aromatic compound (A) is preferably one which satisfies both conditions that each of $R^1$, $R^2$, $R^3$ and $R^4$ in $Y^1$ and $Y^2$ in the formula (A) is a hydrogen atom, and that in the formula (A), c is 0, or c is an integer of from 1 to 4 and $Rf^1$ is a $C_{1-8}$ perfluoroalkyl group, particularly preferably a compound represented by the following formula (A-1) or (A-2):

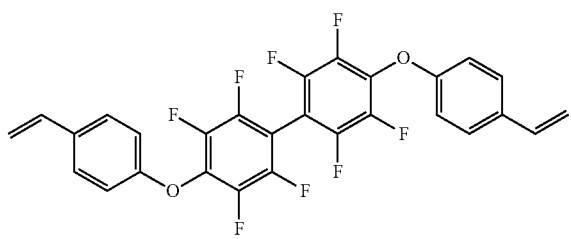

(A-1)

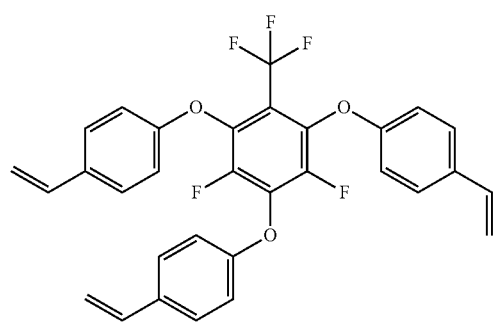

(A-2)

<Method for Producing Fluorinated Aromatic Compound (A)>

The method for producing a fluorinated aromatic compound (A) is not particularly limited, but is preferably a method wherein an aromatic compound represented by the following formula (a1) (hereinafter referred to as the aromatic compound (a1)) and a fluorinated aromatic compound represented by the following formula (a2) (hereinafter referred to as the fluorinated aromatic compound (a2)) are subjected to a condensation reaction in the presence of a HF elimination agent.

In the condensation reaction, ether bonds will be formed by such a reaction mechanism that phenoxy ions derived from —OX of the aromatic compound (a1)) will attack carbon atoms to which fluorine atoms are bonded in the aromatic ring of the fluorinated aromatic compound (a2), and then, the fluorine atoms will be detached. Thereby, the fluorinated aromatic compound (A) is obtainable.

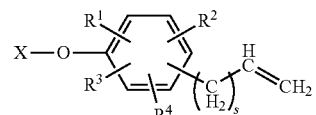

(a1)

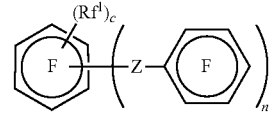

(a2)

In the formula (a1), s is 0 or 1, each of $R^1$, $R^2$, $R^3$ and $R^4$ which are independent of one another, is a hydrogen atom or a fluorine atom, and X is a hydrogen atom, $CH_3CO$, $CH_3CH_2CO$, $(CH_3)_3C(CH_3)_2Si$ or $(CH_3)_3Si$. In the formula (a2), n is an integer of from 0 to 6, c is an integer of from 0 to 4, c+n is from 0 to 6, Z is a single bond, —O—, —S—, —CO—, —C(CH_3)_2—, —C(CF_3)_2—, —SO— or —SO_2—, and $Rf^1$ is a $C_{1-8}$ fluoroalkyl group. F in the aromatic ring represents that hydrogen atoms of the aromatic ring are all substituted by fluorine atoms.

The preferred ranges and more preferred ranges of s, $R^1$, $R^2$, $R^3$ and $R^4$ in the formula (a1), are the same as those in the formula (A).

X is preferably a hydrogen atom, $CH_3CO$ or $CH_3CH_2CO$.

Specific examples of the aromatic compound (a1)) include phenols having a reactive double bond, e.g. ethenyl phenols such as 4-ethenyl phenol (referred to also as 4-hydroxystyrene), 2-ethenyl phenol, 3-ethenyl phenol, 4-ethenyl-tetrafluorophenol, etc., 2-propenyl phenols such as 2-(2-propenyl) phenol, 3-(2-propenyl) phenol, 4-(2-propenyl) phenol, etc., and their derivatives such as 4-ethenyl-1-acetoxy benzene (referred to also as p-acetoxystyrene), 4-ethenyl-1-trimethylsiloxy benzene, etc. In these derivatives, in the production of a fluorinated aromatic compound (A), an acetoxy group or trimethylsiloxy group is converted to a hydroxy group (a phenolic hydroxy group), to react with a fluorinated aromatic compound (a2).

From the viewpoint of the reactivity of crosslinkable unsaturated double bonds, the aromatic compound (a1)) is more preferably an aromatic compound having an ethenyl group, further preferably an aromatic compound containing no fluorine atom, most preferably 4-ethenyl phenol or 4-ethenyl-1-acetoxy benzene.

The fluorinated aromatic compound (a2) constitutes the skeleton of the fluorinated aromatic compound (A).

The preferred range and more preferred range of n, c, Z and $Rf^1$ in the formula (a2) are the same as those in the formula (A).

Specific examples of the fluorinated aromatic compound (a2) include perfluorobenzene, perfluorotoluene, perfluoroxylene, perfluorobiphenyl, perfluoroterphenyl, a perfluorotriphenyl benzene, a perfluorotetraphenyl benzene, a perfluoropentaphenyl benzene, a perfluorohexaphenyl benzene, a 1,1'-oxybis[2,3,4,5,6-pentafluoro benzene], a 1,1'-thiobis[2,3,4,5,6-pentafluorobenzene], a bis(2,3,4,5,6-pentafluorophenyl) methanone, a 1,1'-sulfonyl bis[2,3,4,5,6-pentafluorobenzene], a 1,2,3,4,5-pentafluoro-6-[(2,3,4,5,6-pentafluorophenyl) sulfinyl]benzene, etc.

As the fluorinated aromatic compound (a2), from the viewpoint of the production efficiency and availability of raw materials, perfluorobenzene, perfluorotoluene or perfluorobiphenyl is preferred. Further, from such a viewpoint that the crosslinked product will be excellent in heat resistance, perfluorotoluene or perfluorobiphenyl is more preferred.

The HF elimination agent to be used in the production of the fluorinated aromatic compound (A) is preferably a basic compound, particularly preferably a carbonate, hydrogen carbonate or hydroxide of an alkali metal. Specific examples include sodium carbonate, potassium carbonate, sodium hydrogen carbonate, potassium hydrogen carbonate, sodium hydroxide and potassium hydroxide. As the HF elimination agent, an alkali metal hydroxide is preferred.

In the condensation reaction of an aromatic compound (a1)) and a fluorinated aromatic compound (a2), the amount of the HF elimination agent is required to be at least 1 mol, preferably from 1.1 to 3 mol, per 1 mol of the aromatic compound (a1).

The condensation reaction is preferably carried out in a polar solvent, from the viewpoint of the solubility of reaction reagents and the increase of the reaction rate. The polar solvent is preferably a solvent comprising an aprotic polar solvent such as N,N-dimethylacetamide, N,N-dimethylformamide, N-methylpyrrolidone, dimethyl sulfoxide, sulfolane or the like.

In the polar solvent, within a range not to decrease the solubility of the resulting fluorinated aromatic compound (A) and not to adversely affect the condensation reaction, toluene, xylene, benzene, tetrahydrofuran, benzotrifluoride, xylene hexafluoride, etc. may be contained. By containing these, the polarity (dielectric constant) of the solvent may be changed, so that it is possible to control the reaction rate.

Further, it is not impossible to produce the fluorinated aromatic compound (A) by the above production method in a solvent other than the polar solvent. For example, the production is possible even by using a low polar solvent such as ethylene glycol dimethyl ether, diethylene glycol dimethyl ether (hereinafter referred to also as diglyme), triethylene glycol dimethyl ether or tetraethylene glycol dimethyl ether.

The condensation reaction conditions are preferably from 1 to 72 hours at from 0 to 100° C.

Particularly, in the case of conducting the condensation reaction in a polar solvent, in order to prevent an abrupt progress of the reaction, or to prevent a side reaction that inhibits the production of the desired product, from 2 to 48 hours at from 3 to 50° C. are preferred, from 9 to 24 hours at from 5 to 20° C. are more preferred, and from 12 to 24 hours at from 5 to 10° C. are particularly preferred.

In the case of conducting the condensation reaction in a non-polar solvent, from the viewpoint of the production efficiency or the increase of the reaction rate, from 12 to 24 hours at from 40 to 80° C. are particularly preferred.

After the condensation reaction of the aromatic compound (a1)) and the fluorinated aromatic compound (a2), the fluorinated aromatic compound (A) may, as the case requires, be purified by a method such as neutralization, reprecipitation, extraction or filtration. From the viewpoint of efficiency, such purification is preferably carried out in a state where the polar solvent preferably used in the production is present.

The structure of the obtained fluorinated aromatic compound (A) can be identified by a known analytical method such as nuclear magnetic resonance (NMR), size exclusion chromatography (SEC) or the like.

[Fluorinated Aromatic Compound (B)]

The fluorinated aromatic compound (B) is one having said group (1) and an ether bond, obtained by subjecting a fluorinated aromatic compound (x) represented by the above formula (x), either one or both of an aromatic compound (y1) having said group (1) and a phenolic hydroxy group and an aromatic compound (y2) having said group (1) and a fluorine atom substituting an aromatic ring, and an aromatic compound (z) having at least three phenolic hydroxy groups, to a condensation reaction in the presence of a HF elimination agent.

In the condensation reaction, ether bonds will be formed by such a reaction mechanism that phenoxy ions derived from the phenolic hydroxy group of the aromatic compound (z) or the aromatic compound (y1) will attack carbon atoms to which fluorine atoms in an aromatic ring of the fluorinated aromatic compound (x) or the aromatic compound (y2) are bonded, or carbon atoms to which fluorine atoms in the fluoroalkyl group are bonded, and then, the fluorine atoms are detached. Depending upon the positional relationship among the aromatic rings in the condensation reaction, it is possible that a dioxin skeleton is formed.

The fluorinated aromatic compound (B) obtained in this manner has a polyarylene structure in which a plurality of aromatic rings are bonded via a linking group containing an ether bond. Further, in the molecular structure of the fluorinated aromatic compound (B), a branched structure is introduced by the compound (z). Further, the fluorinated aromatic compound (B) has fluorine atoms derived from the aromatic compound (x) or the aromatic compound (y2), and has group (1) derived from the aromatic compound (y1) or the aromatic compound (y2).

<Fluorinated Aromatic Compound (x)>

In the formula (x), N is an integer of from 0 to 3. N is preferably 0 to 2, more preferably 0 or 1.

Each of d and e which are independent of each other, is an integer of from 0 to 3. Each of d and e which are independent of each other, is preferably from 0 to 2, more preferably 0 or 1.

If $Rf^2$ and $Rf^3$ are many, the production of the fluorinated aromatic compound (B) becomes difficult, and therefore, d+e is preferably from 0 to 4, more preferably from 0 to 2, most preferably 0.

The number of carbon atoms in the fluoroalkyl group for $Rf^2$ and $Rf^3$ is preferably from 1 to 6, more preferably from 1 to 4, most preferably 1. As the fluoroalkyl group, a perfluoroalkyl group is preferred, since it is excellent in heat resistance. Specific examples thereof include a perfluoromethyl group, a perfluoroethyl group, a perfluoropropyl group, a perfluorobutyl group, a perfluorohexyl group, a perfluorooctyl group, etc.

$Rf^2$ and $Rf^3$ may be the same or different, and they are preferably the same and particularly preferably perfluoromethyl groups.

The fluorinated aromatic compound (x) is preferably perfluorobenzene, perfluorotoluene, perfluoroxylene, perfluorobiphenyl, perfluoroterphenyl, a perfluorotriphenyl benzene, a perfluorotetraphenyl benzene, a perfluoropentaphenyl benzene, or a perfluorohexaphenyl benzene, particularly preferably perfluorobenzene, perfluorotoluene or perfluorobiphenyl. From the viewpoint of high heat resistance, perfluorotoluene or perfluorobiphenyl is more preferred as the fluorinated aromatic compound (x).

The molecular weight of the fluorinated aromatic compound (x) is more preferably from 150 to 2,000 and most preferably from 150 to 1,000. Within this range, it is possible to easily produce a fluorinated aromatic compound (B) having a mass average molecular weight of from $1.0 \times 10^4$ to $5.0 \times 10^4$.

<Aromatic Compound (y1), Aromatic Compound (y2)>

The aromatic compound (y1) is preferably an aromatic compound having one phenolic hydroxy group. The aromatic compound (y1) may or may not contain fluorine atoms.

Specific examples of the aromatic compound (y1) having no fluorine atoms include phenols having a reactive double bond, e.g. ethenyl phenols such as 4-ethenylphenol (referred to also as 4-hydroxystyrene), 2-ethenyl phenol, 3-ethenyl phenol, 4-ethenyl-tetrafluoro phenol, etc., 2-propenyl phenols such as 2-(2-propenyl) phenol, 3-(2-propenyl) phenol, etc., and their derivatives such as 4-ethenyl-1-acetoxy benzene (referred to also as p-acetoxystyrene), 4-ethenyl-1-trimethylsiloxy benzene, etc.

Specific examples of the aromatic compound (y1) containing fluorine atoms include fluorophenols having a reactive double bond, e.g. fluoroethenyl phenols such as 4-ethenyl-2-fluorophenol, 4-ethenyl-3-fluorophenol, 4-ethenyl-2,3-difluorophenol, 5-ethenyl-3-fluorophenol, etc., 4-(2-propenyl)tetrafluorophenol, etc., and their derivatives such as 4-ethenyl-3-fluoro-1-acetoxy benzene, etc.

In the above-mentioned various derivatives, in the production of the fluorinated aromatic compound (B), an acetoxy group or trimethylsiloxy group is converted to a hydroxyl group (a phenolic hydroxyl group), which is then reacted with a fluorinated aromatic compound (x).

From the viewpoint of the reactivity of a crosslinkable unsaturated double bond, the aromatic compound (y1) is more preferably an aromatic compound having an ethenyl group, most preferably an aromatic compound containing no fluorine atom.

Specific examples of the aromatic compound (y2) include fluorobenzenes having a reactive double bond, e.g. fluoroethenyl benzenes such as 4 ethenyl-2-fluorobenzene, 4-ethenyl-3-fluorobenzene, 4-ethenyl-2,3-difluorobenzene, 5-ethenyl-3-fluorobenzene, etc., 4-(2-propenyl)tetrafluorobenzene, etc.

One of them may be used alone, or two or more of them may be used as mixed.

<Aromatic Compound (z)>

The aromatic compound (z) is preferably a polyfunctional phenol having at least three phenolic hydroxyl groups.

The number of phenolic hydroxyl groups in the aromatic compound (z) is preferably from 3 to 6, more preferably from 3 to 4.

Specific examples of the aromatic compound (z) include trihydroxybenzene, trihydroxybiphenyl, trihydroxynaphthalene, 1,1,1-tris(4-hydroxyphenyl)ethane, tris(4-hydroxyphenyl)benzene, tetrahydroxy-benzene, tetrahydroxy-biphenyl, tetrahydroxy binaphthyl, a tetrahydroxy spiroindane, etc. As the compound (z), trihydroxybenzene or 1,1,1-tris(4-hydroxyphenyl)ethane is more preferred, since the dielectric constant of the crosslinked product will be low.

In the production of the fluorinated aromatic compound (B), the condensation reaction of the fluorinated aromatic compound (x), either one or both of the aromatic compound (y1) and the aromatic compound (y2), and the aromatic compound (z), may be carried out all in one step, or may be carried out separately in multiple steps. Further, among the reaction raw materials, specific compounds may be firstly preferentially reacted, and then, another compound is reacted subsequently. In the case of carrying out the condensation reaction separately in multiple steps, an intermediate product obtained in the way, may be separated from the reaction system and purified, and then may be used for the subsequent reaction (condensation reaction). In the reaction site, the raw material compounds may introduced all at once, or may be continuously charged or intermittently charged.

As the HF elimination agent to be used in the condensation reaction of the fluorinated aromatic compound (x), either one or both of the aromatic compound (y1) and the aromatic compound (y2), and the compound (z), the same one as mentioned in the description of the aromatic compound (A) may be mentioned.

The fluorinated aromatic compound (B) can be produced in accordance with the production method described in Japanese Patent No. 4,730,436.

The mass average molecular weight of the fluorinated aromatic compound (B) is preferably from $1.0 \times 10^4$ to $5.0 \times 10^4$, more preferably from $1.0 \times 10^4$ to $3.0 \times 10^4$, particularly preferably from $1.0 \times 10^4$ to $2.0 \times 10^4$. When the mass average molecular weight is low, the molecular chain is short, and the crosslinked product will be excellent in heat resistance.

Here, the mass average molecular weight in the present specification is a mass average molecular weight calculated as polystyrene obtained by measurement by gel permeation chromatography by using a calibration curve prepared by using a standard polystyrene sample having a known molecular weight.

[Aromatic Hydrocarbon (C)]

The aromatic hydrocarbon having at least two vinyl groups bonded to an aromatic ring (hereinafter referred to as the aromatic hydrocarbon (C)) may, for example, be a compound represented by the following formula (C1) (hereinafter referred to as a compound (C1)).

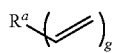

(C1)

In the formula, g is an integer of from 2 to 6, and $R^a$ is a g-valent aromatic hydrocarbon group.

In the formula (C1), g is preferably 2 or 3.

The aromatic hydrocarbon group for $R^a$ may be a group obtained by removing g hydrogen atoms from an aromatic hydrocarbon such as benzene, naphthalene, biphenyl, anthracene, phenanthrene, tetracene or pyrene.

$R^a$ is preferably a group obtained by removing g hydrogen atoms from benzene, or a group obtained by removing g hydrogen atoms from an aromatic hydrocarbon consisting of from 2 to 4 benzene rings.

Specific examples of the compound (C1) in the case where $R^a$ is a group obtained by removing g hydrogen atoms from benzene, include divinyl benzene, trivinyl benzene, etc.

Specific examples of the compound (C1) in the case where $R^a$ is a group obtained by removing g hydrogen atoms from an aromatic hydrocarbon consisting of from 2 to 4 benzene rings, include compounds represented by the following formulae (C1-1) to (C1-7) (hereinafter referred to as the compound (C1-1) to compound (C1-7)), etc.

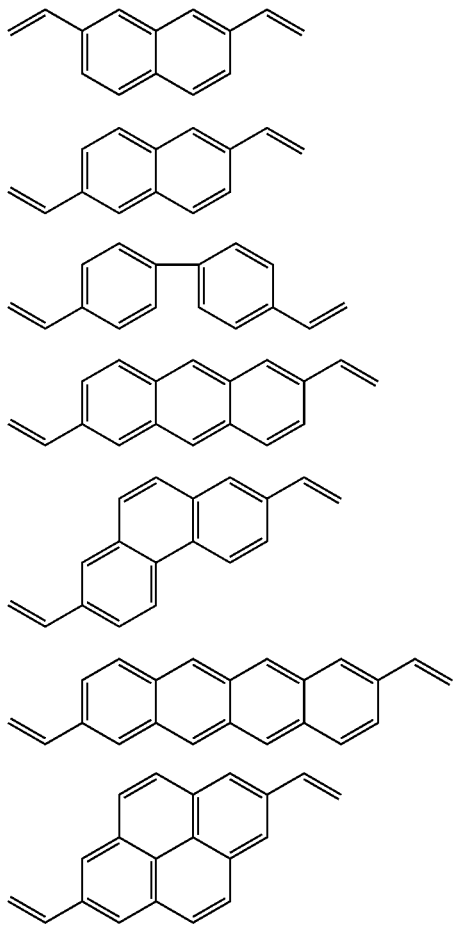

The aromatic hydrocarbon (C) may be a commercially available one or may be one produced in accordance with a known production method.

For example, divinylbenzene and the compound (C1-3) are, respectively, commercially available as reagents. The compound (C1-1) can be produced in accordance with the description in JP-A-11-158255. The compound (C1-2) can be produced in accordance with the description in Advanced Synthesis & Catalysis (Adv. Synth. Catal.), 2009, 351, 2024-2030. The compound (C1-7) can be produced in accordance with the description in J. Org. Chem., 1983, 48 (17), 2930-2932.

In the present invention, one of such crosslinkable aromatic compounds may be used alone, or two or more of them may be used in combination.

The content of the crosslinkable aromatic compound in the crosslinkable fluorinated elastomer composition of the present invention is preferably from 0.1 to 15 mass %, more preferably from 0.1 to 12 mass %, most preferably from 0.1 to 10 mass %, based on the mass of the fluorinated elastomer.

When the content of the crosslinkable aromatic compound is within the above range, the crosslinkable fluorinated elastomer composition is excellent in crosslinking reactivity, and the resulting crosslinked product will be excellent in heat resistance, chemical resistance, and rubber physical properties including compression set, etc.

(Fluorinated Elastomer)

The fluorinated elastomer in the present invention may, for example, be a copolymer of fluoromonomers, or a copolymer of a fluoromonomer and a hydrocarbon monomer.

The fluoromonomer may, for example, be tetrafluoroethylene (hereinafter referred to as TFE), vinylidene fluoride (hereinafter referred to as VDF), chlorotrifluoroethylene (hereinafter referred to as CTFE), hexafluoropropylene (hereinafter referred to as HFP), a perfluoro(alkyl vinyl ether) (hereinafter referred to as PAVE) or 3,3,3,2-tetrafluoro-1-propene.

PAVE is preferably a compound represented by $CF_2=CFO-R^{fa}$ (wherein $R^{fa}$ is a $C_{1-10}$ perfluoroalkyl group or a $C_{2-10}$ perfluoroalkyl group having at least one etheric oxygen atom between carbon atoms (referred to also as an oxa perfluoroalkyl group)).

Specific examples of PAVE include perfluoro(methyl vinyl ether), perfluoro(ethyl vinyl ether), perfluoro(propyl vinyl ether), perfluoro(methoxyethyl vinyl ether), perfluoro(ethoxyethyl vinyl ether), and perfluoro(propoxypropyl vinyl ether). In particular, perfluoro(methyl vinyl ether), perfluoro(ethyl vinyl ether) or perfluoro(propyl vinyl ether) is preferred.

One of such fluoromonomers may be used alone, or two or more of them may be used in combination.

The hydrocarbon monomer may, for example, be an olefin such as ethylene (hereinafter referred to as E), propylene (hereinafter referred to as P), isobutene or 1-butene.

One of such hydrocarbon monomers may be used alone, or two or more of them may be used in combination.

The copolymer of fluoromonomers may, for example, be a TFE/PAVE copolymer, a VDF/HFP copolymer, a TFE/VDF/HFP copolymer, a VDF/HFP/PAVE copolymer, a VDF/CTFE copolymer or the like.

The copolymer of a fluoromonomer and a hydrocarbon monomer may, for example, be a TFE/P copolymer, a TFE/P/VDF copolymer, a TFE/P/CTFE copolymer, an E/HFP copolymer or the like.

The fluorinated elastomer is preferably at least one member selected from the group consisting of a TFE/PAVE copolymer, a VDF/HFP copolymer, a TFE/VDF/HFP copolymer, a VDF/HFP/PAVE copolymer, a TFE/P copolymer and a TFE/P/VDF copolymer, more preferably a TFE/PAVE copolymer. These fluorinated elastomers are excellent in heat resistance.

The copolymerization composition of a TFE/PAVE copolymer is preferably structural units based on TFE/structural units based on PAVE=30/70 to 80/20 (molar ratio), more preferably 50/50 to 75/25 (molar ratio), most preferably 55/45 to 70/30 (molar ratio).

The copolymerization composition of a VDF/HFP copolymer is preferably structural units based on VDF/structural units based on HFP=60/40 to 95/5 (molar ratio), more preferably 70/30 to 90/10 (molar ratio), most preferably 75/25 to 85/15 (molar ratio).

The copolymerization composition of a TFE/VDF/HFP copolymer is preferably structural units based on TFE/structural units based on VDF/structural units based on HFP=5/50/45 to 65/30/5 (molar ratio), more preferably 15/50/35 to 25/65/10 (molar ratio), most preferably 20/50/30 to 20/65/15 (molar ratio).

The copolymerization composition of a TFE/P copolymer is preferably structural units based on TFE/structural units based on P=40/60 to 70/30 (molar ratio), more preferably 45/55 to 65/35 (molar ratio), most preferably 50/50 to 60/40 (molar ratio).

The fluoroelastomer may have, in addition to structural units based on the above monomers, structural units based on other monomers.

Such other monomers are preferably a fluorodiene, a monomer containing either one or both of an iodine atom and a bromine atom, and the like.

Said fluorodiene is a compound having at least one fluorine atom and two polymerizable double bonds and having no cyclopolymerizability.

The fluorodiene may, for example, be a perfluorodiene composed of carbon atoms and fluorine atoms, a perfluorodiene composed of carbon atoms, fluorine atoms and an oxygen atom, a fluorodiene having hydrogen atoms, or the like. The fluorodiene is preferably a perfluorodiene, more preferably a perfluorodiene composed of carbon atoms, fluorine atoms and an oxygen atom, most preferably a perfluorodiene having a perfluorovinyl ether group, since the crosslinked product will be excellent in heat resistance and chemical resistance.

Specific examples of the perfluorodiene having a perfluorovinyl ether group include $CF_2$=$CFO(CF_2)_3OCF$=$CF_2$, $CF_2$=$CFO(CF_2)_4OCF$=$CF_2$, $CF_2$=$CFO(CF_2)_5OCF$=$CF_2$, $CF_2$=$CFO(CF_2)_6OCF$=$CF_2$, $CF_2$=$CFO(CF_2)_4OCF(CF_3)CF_2OCF$=$CF_2$, etc.

Specific examples of the fluorodiene having hydrogen atoms include $CH_2$=$CFCF_2O(CF_2)_2OCF_2CF$=$CH_2$, $CH_2$=$CFCF_2O(CF_2)_3OCF_2CF$=$CH_2$, $CH_2$=$CFCF_2O(CF_2)_4OCF_2CF$=$CH_2$, $CH_2$=$CFCF_2O(CF_2)_2OCF(CF_3)CF_2OCF$=$CF_2$, $CH_2$=$CFCF_2OCF(CF_3)CF_2OCF$=$CF_2$, $CH_2$=$CFCF_2OCF(CF_3)CF_2OCF(CF_3)CF_2OCF$=$CF_2$, $CH_2$=$CH(CF_2)_4CH$=$CH_2$, $CH_2$=$CH(CF_2)_6CH$=$CH_2$, $CH_2$=$CHCF_2CF_2OCF_2CF_2CH$=$CH_2$, etc.

The fluorodiene is preferably $CF_2$=$CFO(CF_2)_3OCF$=$CF_2$, $CF_2$=$CFO(CF_2)_4OCF$=$CF_2$, $CH_2$=$CH(CF_2)_4CH$=$CH_2$, $CH_2$=$CH(CF_2)_6CH$=$CH_2$ or $CH_2$=$CHCF_2CF_2OCF_2CF_2CH$=$CH_2$, more preferably $CF_2$=$CFO(CF_2)_3OCF$=$CF_2$, $CF_2$=$CFO(CF_2)_4OCF$=$CF_2$, $CH_2$=$CH(CF_2)_4CH$=$CH_2$ or $CH_2$=$CH(CF_2)_6CH$=$CH_2$.

When the fluorinated elastomer has structural units based on a fluorodiene, the fluorinated elastomer becomes to have a branched structure, whereby the number of polymer terminal groups per molecule exceeds 2 on average. Thus, in the case of a fluorinated elastomer having an iodine atom or a bromine atom at a polymer chain terminal, a fluorinated elastomer composition containing a fluorinated elastomer having structural units based on a fluorodiene, is excellent in crosslinking reactivity, as compared with a fluorinated elastomer composition containing an unbranched linear fluorinated elastomer.

In the fluorinated elastomer, the content of structural units based on a fluorodiene, is preferably from 0.01 to 5 mol %, more preferably from 0.01 to 3 mol %, most preferably from 0.05 to 1 mol %, based on all the structural units in the fluorinated elastomer.

Specific examples of the monomer containing either one or both of an iodine atom and a bromine atom include $CF_2$=$CFBr$, $CH_2$=$CHCF_2CF_2Br$, $CF_2$=$CFOCF_2CF_2I$, $CF_2$=$CFOCF_2CF_2Br$, $CF_2$=$CFOCF_2CF_2I$, $CF_2$=$CFOCF_2CF_2CH_2Br$, $CF_2$=$CFOCF_2CF(CF_3)OCF_2CF_2CH_2I$, $CF_2$=$CFOCF_2CF(CF_3)OCF_2CF_2CH_2Br$, etc.

The monomer containing either one or both of an iodine atom and a bromine atom, is preferably $CF_2$=$CFBr$, $CH_2$=$CHCF_2CF_2Br$, $CF_2$=$CFOCF_2CF_2I$, $CF_2$=$CFOCF_2CF_2Br$, $CF_2$=$CFOCF_2CF_2CH_2I$ or $CF_2$=$CFOCF_2CF_2CH_2Br$, more preferably $CF_2$=$CFOCF_2CF_2I$ or $CF_2$=$CFOCF_2CF_2CH_2I$.

When a fluorinated elastomer has structural units based on a monomer containing either one or both of an iodine atom and a bromine atom, a fluorinated elastomer having an iodine atom or a bromine atom in its side chain is obtainable.

In the fluorinated elastomer, the content of structural units based on a monomer containing either one or both of an iodine atom and a bromine atom is preferably from 0.01 to 5 mol %, more preferably from 0.01 to 3 mol %, most preferably from 0.05 to 1 mol %, based on all structural units in the fluorinated elastomer.

The fluorinated elastomer preferably has an iodine atom or a bromine atom at a polymer chain terminal or in a side chain, and more preferably contains an iodine atom. The iodine atom or the bromine atom serves as a crosslinking point which reacts with a crosslinkable unsaturated double bond which the above-mentioned aromatic compound has. When the fluorinated elastomer contains an iodine or a bromine atom, the fluorinated elastomer composition of the present invention will be excellent in crosslinking reactivity, and its crosslinked product will be excellent in heat resistance, and chemical resistance.

The total content of iodine atoms and bromine atoms in the fluorinated elastomer is preferably from 0.1 to 30 µmol/g, more preferably from 0.2 to 20 µmol/g as the molar amount per 1 g of the fluorinated elastomer. When it is within this range, the fluorinated elastomer composition will be excellent particularly in cross-linking reactivity.

Further, the fluorinated elastomer having an iodine atom at a polymer chain terminal is preferably produced by a method of producing a fluorinated elastomer in the presence of a chain transfer agent having an iodine atom or a bromine atom, as described hereinafter.

The fluorinated elastomer is preferably a perfluoroelastomer, since it is particularly excellent in heat resistance and chemical resistance of a crosslinked product. Further, from such a viewpoint that it is possible to control the number of crosslinking reactive sites, and it is easy to develop rubber characteristics, a TFE/PAVE copolymer having an iodine atom at a polymer chain terminal is particularly preferred.

The Mooney viscosity of the fluorinated elastomer is preferably from 50 to 250, more preferably from 50 to 200, and most preferably from 50 to 150. The Mooney viscosity is an index for the molecular weight. When the Mooney viscosity is small (high molecular weight), the physical properties of the crosslinked product will be good, but if it is too small, the flowability tends to be low, and the processability will be poor. On the other hand, if it is too large (low molecular weight), the physical properties of the cross-linked product will be poor. When the Mooney viscosity is within the above range, the processability will be excellent, and the crosslinked product will be excellent in rubber properties.

The Mooney viscosity of a fluorinated elastomer is represented, for example, by a viscosity measured in accordance with JIS K6300, using a large rotor with a diameter of 38.1 mm and a thickness of 5.54 mm, at 100° C., and setting the preheat time for 1 minute and the rotor rotation time for 4 minutes.

As an index for the molecular weight, it is also preferred to use the storage modulus G'.

The storage modulus G' of the fluorinated elastomer is preferably from 200 to 700 kPa, more preferably from 300 to 650 kPa, most preferably from 400 to 600 kPa. G' is an index for the molecular weight. When G' is large (high molecular weight), the physical properties of the crosslinked product will be good, but if it is too large, the flowability tends to be low and the processability will be poor. On the other hand, if G' is too small (low molecular weight), the physical properties of the crosslinked product will be poor, but the flowability will be high and the processability will be good. When G' is within the above range, the processability will be excellent, and the crosslinked product will be excellent in rubber properties.

The storage modulus G' of the fluorinated elastomer is measured by a dynamic viscoelasticity measuring apparatus (DMA), as will be described hereinafter.

<Method for Producing Fluorinated Elastomer>

The fluorinated elastomer can be produced by subjecting a monomer mixture containing a fluoromonomer to radical polymerization by a usual method.

The radical polymerization method may be a known polymerization method such as an emulsion polymerization method, a solution polymerization method, a suspension polymerization method, or a bulk polymerization method. In particular, an emulsion polymerization method using a water-soluble radical polymerization initiator is preferred. The emulsion polymerization is suitable for the production of a fluorinated elastomer having a high molecular weight.

In the emulsion polymerization, the monomer mixture is polymerized in the presence of an aqueous medium, an emulsifier, a radical polymerization initiator and, as the case requires, a chain transfer agent, to produce a fluorinated elastomer.

The polymerization temperature is preferably from 0 to 100° C., more preferably from 10 to 90° C. The polymerization time is preferably from 6 to 24 hours, more preferably from 6 to 12 hours. The polymerization pressure is preferably from 0.1 to 20 MPa, more preferably from 0.3 to 10 MPa. Within such ranges, the monomer conversion is good, and the polymer yield is also high. Further, the productivity is excellent.

The radical polymerization initiator may be a known radical polymerization initiator which is commonly used in the production of a fluorinated elastomer. The radical polymerization initiator may be suitably selected for use depending on the polymerization method. In the case of polymerization in an aqueous medium (such as an emulsion polymerization method), a water-soluble radical polymerization initiator is preferred. In the case of a solution polymerization, an organic peroxide initiator or an azo-type initiator is preferred.

As the water-soluble radical polymerization initiator, a persulfate such as ammonium persulfate, hydrogen peroxide, disuccinic acid peroxide, or an organic initiator such as azobisisobutylamidine dihydrochloride, may for example be mentioned. Further, it is also possible to use a redox initiator comprising a combination of a persulfate or hydrogen peroxide, and a reducing agent such as sodium hydrogen sulfite, sodium thiosulfate or the like, or an inorganic initiator having a small amount of iron, a ferrous salt, silver sulfate, etc. allowed to coexist in the redox initiator.

The radical polymerization initiator may be charged all at once in the initial stage of the radical copolymerization, or may be sequentially supplied along with progress of the polymerization. From the viewpoint of uniformity of the polymerization reaction, controllability of the molecular weight distribution of the obtainable fluorinated elastomer, etc., it is preferably sequentially supplied along with the progress of the polymerization reaction.

The amount of the radical polymerization initiator is preferably from 0.01 to 3 mass %, more preferably from 0.1 to 1 mass %, based on the total mass of all monomers.

The aqueous medium may, for example, be water, or a mixture of water and a water-soluble organic solvent.

The water-soluble organic solvent may, for example, be tert-butanol, propylene glycol, dipropylene glycol, dipropylene glycol monomethyl ether or tripropylene glycol. When the aqueous medium contains a water-soluble organic solvent, it is possible to improve the dispersibility of the monomers and the dispersibility of the resulting polymer, and it is possible to increase the productivity.

As the aqueous medium, water is preferred.

As the emulsifier, it is possible to employ an emulsifier which is commonly used in a conventional emulsion polymerization. Since an obtainable latex will be excellent in mechanical and chemical stability, an ionic emulsifier is preferred, and an anionic emulsifier is more preferred.

The anionic emulsifier may, for example, be an anionic hydrocarbon-type emulsifier or an anionic fluorinated emulsifier.

Specific examples of the anionic hydrocarbon-type emulsifier include sodium lauryl sulfate, ammonium lauryl sulfate, sodium dodecylbenzene sulfonate, etc.

The anionic fluorinated emulsifier may, for example, be a fluorinated carboxylic acid which may have an etheric oxygen atom, or its salt, or a fluorinated sulfonic acid or its salt. The salt may, for example, be an ammonium salt or an alkali metal salt (such as Li, Na or K), and an ammonium salt is preferred. Among them, a fluorinated carboxylic acid which may have an ether oxygen atom, or its salt, is preferred, and a C5-7 fluorinated carboxylic acid which may have from 1 to 3 etheric oxygen atoms, or its salt, is more preferred.

Specific examples of the fluorinated carboxylic acid include a perfluorocarboxylic acid, a perfluorocarboxylic acid having an etheric oxygen atom, a fluorinated carboxylic acid having a hydrogen atom, etc.

The perfluorocarboxylic acid may, for example, be perfluorooctanoic acid, perfluoroheptanoic acid or perfluorohexanoic acid.

The perfluorocarboxylic acid having an etheric oxygen atom may, for example, be $C_3F_7OCF(CF_3)CF_2OCF(CF_3)COOH$, $C_4F_9OC_2F_4OCF_2COOH$, $C_3F_7OC_2F_4OCF_2COOH$, $C_2F_5OC_2F_4OCF_2COOH$, $C_2F_5OCF_2CF_2OCF_2CF_2OCF_2COOH$, $C_2F_5O(CF_2)_5COOH$, $CF_3OC_2F_4OCF_2COOH$, $CF_3OCF_2OCF_2OCF_2COOH$, $CF_3OCF_2OCF_2OCF_2OCF_2COOH$, $CF_3O(CF_2CF_2O)_2CF_2COOH$, $CF_3OCF_2CF_2CF_2OCF_2COOH$, $C_4F_9OCF_2COOH$, $C_4F_9OCF_2CF_2COOH$, $CF_3OCF(CF_3)CF_2OCF(CF_3)COOH$ or $C_4F_9OCF(CF_3)COOH$.

The fluorinated carboxylic acid having a hydrogen atom may, for example, be ω-hydroperfluorooctanoic acid, $C_3F_7OCF(CF_3)CF_2OCHFCOOH$, $CF_3CFHO(CF_2)_5COOH$, $CF_3O(CF_2)_3OCHFCF_2COOH$, $CF_3O(CF_2)_3OCHFCOOH$ or $C_3F_7OCHFCF_2COOH$, $CF_3CFHO(CF_2)_3COOH$.

The fluorinated sulfonic acid may, for example, be perfluorooctane sulfonic acid or $C_6F_{13}CH_2CH_2SO_3H$.

It is preferred to use a chain transfer agent, since it is thereby possible to properly control the molecular weight of the fluorinated elastomer. As the chain transfer agent, one having either one or both of an iodine atom and a bromine atom is preferred. For example, a diiodo compound having two iodine atoms, or a monoiodo monobromo compound having one iodine atom and one bromine atom may be mentioned.

In particular, in the production of a fluorinated elastomer containing an iodine atom or a bromine atom at a polymer chain terminal, it is preferred to use a chain transfer agent having an iodine atom or a bromine atom.

As the chain transfer agent having an iodine atom or a bromine atom, $IR^{f4}I$ or $IR^{f5}Br$ is preferred.

Each of $R^{f4}$ and $R^{f5}$ is a $C_{1-12}$ fluoroalkylene group or a $C_{2-12}$ fluoroalkylene group having at least one etheric oxygen atom between carbon atoms (referred to also as an oxa-fluoroalkylene group).

Each of $R^{f4}$ and $R^{f5}$ is preferably a $C_{3-12}$ fluoroalkylene group or oxa-fluoroalkylene group, more preferably a $C_3$-12 perfluoroalkylene group.

$IR^{f4}I$ may, for example, be diiodo-difluoromethane, 1,2-diiodoperfluoroethane, 1,3-diiodoperfluoropropane, 1,4-diiodoperfluorobutane, 1,5-diiodoperfluoropentane, 1,6-diiodoperfluorohexane, 1,7-diiodoperfluoroheptane or 1,8-diiodoperfluorooctane.

$IR^{f4}I$ is preferably 1,4-diiodoperfluorobutane or 1,6-diiodoperfluorohexane.

$IR^{f5}Br$ may, for example, be 1-iodo-2-bromo-perfluorobutane or 1-iodo-6-bromo-perfluorohexane.

The chain transfer agent may be charged all at once in the initial stage of the radical copolymerization, or may be sequentially supplied along with the progress of the polymerization. In the case of using a chain transfer agent having an iodine atom or a bromine atom, it is preferably charged all at once at the initial stage.

The amount of the chain transfer agent is preferably from 0.01 to 5 mol %, more preferably from 0.05 to 1 mol %, based on the total number of moles of all monomers.

In the emulsion polymerization, it is also preferred to use a pH buffering agent.

The pH buffering agent may, for example, be an inorganic salt (such as disodium hydrogen phosphate, sodium dihydrogen phosphate, sodium hydrogen carbonate or hydrates thereof) or the like.

(Other Components)

The cross-linkable fluorinated elastomer composition of the present invention preferably further contains an organic peroxide. When it contains an organic peroxide, it is possible to increase the reaction probability of the crosslinking point and thereby to contribute to improvement in the productivity, heat resistance and chemical resistance of the crosslinked product. Particularly in a case where a crosslinked product is obtained by heating and crosslinking a crosslinkable fluorinated elastomer composition of the present invention, the crosslinking by heating will be easy when the crosslinkable fluorinated elastomer composition contains an organic peroxide.

The organic peroxide may be one which easily generates radicals by heating and is preferably one, of which the temperature at which its half-life is one minute (referred to also as the one-minute half-life temperature) is from 80 to 220° C. The organic peroxide may, for example, be diisopropylperoxy dicarbonate, 1,1-di(t-hexylperoxy) 3,5,5-trimethylcyclohexane, 2,5-dimethylhexane-2,5-dihydroperoxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy)-hexane, 2,5-dimethyl-2,5-di(t-butylperoxy)-hexyne-3, dibenzoyl peroxide, t-butyl peroxybenzoate, 2,5-dimethyl-2,5-di(benzoyl peroxy) hexane, t-butyl peroxy maleic acid, or t-hexylperoxy isopropyl mono carbonate. Diisopropyl peroxydicarbonate, 2,5-dimethyl-2,5-di(t-butylperoxy)-hexane, or t-butyl peroxy benzoate is particularly preferred.

One of the organic peroxides may be used alone, or two or more of them may be used in combination.

The content of the organic peroxide in the crosslinkable fluorinated elastomer composition is preferably from 0.1 to 5 mass %, more preferably from 0.2 to 4 mass %, most preferably from 0.5 to 3 mass %, based on the mass of the fluorinated elastomer.

When the content of the organic peroxide is at least the lower limit value in the above range, the crosslinkable fluorinated elastomer composition will be excellent in crosslinking reactivity. When the content of the organic peroxide is at most the upper limit value in the above range, crosslinking efficiency of the organic peroxide will be excellent, and the amount of decomposed products will be suppressed.

The crosslinkable fluorinated elastomer composition of the present invention preferably contains a crosslinking aid other than the aromatic compound having at least two crosslinkable unsaturated double bonds in the present invention.

The crosslinking aid other than the aromatic compound having at least two crosslinkable unsaturated double bonds, may, for example, be triallyl isocyanurate (TAIC), trimethallyl isocyanurate (TMAIC), triallyl cyanurate (TAC), trimethallyl cyanurate (TMAC), methyl diallyl isocyanurate (MeDAIC), or diallyl isocyanurate dimer (DAIC-dimer). Further, an allyl group-containing glycoluril compound such as

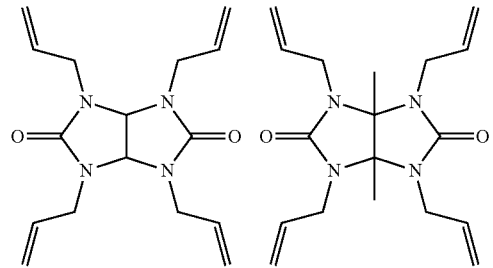

or a maleimide compound such as phenylene bismaleimide or diphenylmethane bismaleimide, may also be mentioned. Among them, TAIC or DAIC-dimer is preferred.

When a crosslinking aid other than the aromatic compound having at least two crosslinkable unsaturated double bonds is contained, its content is preferably from 0.1 to 3 mass %, more preferably from 0.1 to 2 mass %, most preferably from 0.1 to 1 mass %, based on the mass of the fluorinated elastomer.

In the present invention, the mass ratio of the aromatic compound having at least two crosslinkable unsaturated double bonds/the crosslinking aid other than the aromatic compound is preferably from 1/30 to 150/1, more preferably from 1/20 to 120/1, most preferably from 1/10 to 100/1. Within this range, the crosslinkable fluorinated elastomer composition will be excellent in crosslinking reactivity, and a crosslinked product obtained therefrom will be excellent in mechanical properties, heat resistance and chemical resistance.

The crosslinkable fluorinated elastomer composition of the present invention may preferably contain other additives other than the above.

Such other additives include an acid acceptor, a scorch retarder, a pigment, a filler, a reinforcing material, etc.

The acid acceptor may, for example, be an oxide or hydroxide of a divalent metal, or hydrotalcite. Specifically, magnesium oxide, calcium oxide, zinc oxide, lead oxide, copper oxide, magnesium hydroxide, aluminum hydroxide, calcium hydroxide, hydrotalcite, or the like may be mentioned. One of such acid acceptors may be used alone, or two or more of them may be used in combination.

The content of the acid acceptor is preferably from 0.1 to 20 mass %, more preferably from 0.2 to 10 mass %, most preferably from 0.5 to 5 mass %, based on the mass of the fluorinated elastomer.

The scorch retarder may, for example, be a phenolic hydroxyl-containing compound such as bisphenol A, bisphenol AF, phenol or ethyl p-hydroxybenzoate, a quinone such as hydroquinone or hydroquinone monomethyl ether, or an α-methylstyrene dimer such as 2,4-di(3-isopropylphenyl)-4-methyl-1-pentene, 2-(3-isopropylphenyl)-4-(4-isopropylphenyl)-4-methyl-1-pentene or 2,4-di(4-methylphenyl)-4-methyl-1-pentene.

The pigment, filler or reinforcing material may, for example, be carbon black, titanium oxide, silicon dioxide, clay, talc, polytetrafluoroethylene, polyvinylidene fluoride, polyvinyl fluoride, polychlorotrifluoroethylene, a TFE/ethylene copolymer, a TFE/propylene copolymer, a TFE/vinylidene fluoride copolymer or the like. The content of such other additives is preferably from 0.1 to 10 mass %, more preferably from 0.5 to 5 mass %, most preferably from 0.5 to 3 mass %, based on the mass of the fluorinated elastomer.

(Method for Producing Crosslinkable Fluorinated Elastomer Composition)

The crosslinkable fluorinated elastomer composition can be produced by blending the fluorinated elastomer, the aromatic compound having at least two crosslinkable unsaturated double bonds, and, as the case requires, optional components such as an organic peroxide, other additives, etc.

The blending method is not particularly limited, and a known method may be adopted. For example, a method of kneading the fluorinated elastomer, the aromatic compound having at least two crosslinkable unsaturated double bonds, and, as the case requires, optional components such as an organic peroxide, other additives, etc. by means of a kneading machine, such as a two-roll mill, a Banbury mixer or a kneader, may be mentioned. Otherwise, a method of blending by kneading the above respective components in such a state that they are, respectively, dissolved or dispersed in solvents, may be adopted.

The order of blending the components is preferably such that, first, a component which is hardly reactive or decomposable by heat generation, is sufficiently kneaded with the fluorinated elastomer and then, a component which is readily reactive or decomposable, is kneaded. For example, it is preferred that the fluorinated aromatic compound having at least two crosslinkable unsaturated double bonds is kneaded first, and the organic peroxide is kneaded later. During the kneading, in order to prevent the crosslinking reaction, it is preferred to cool the kneader by water to maintain it within a temperature range of from 20 to 120° C. The kneading temperature is more preferably from 40 to 60° C.

[Crosslinked Product]

The crosslinked product of the present invention is made by crosslinking the above crosslinkable fluorinated elastomer composition.

As the crosslinking method, a method of heating, radiation irradiation or the like may be applied. In a case where the crosslinkable fluorinated elastomer composition contains an organic peroxide, crosslinking by heating is preferred.

The crosslinked product of the present invention is usually produced as a molded body having a shape corresponding to the application of the crosslinked product.

Such a molded body may, for example, be produced by molding the crosslinkable fluorinated elastomer composition and carrying out the crosslinking at the same time as or after the molding.

As the method for molding the crosslinkable fluorinated elastomer composition, it is possible to employ a known molding method such as extrusion molding, injection molding, transfer molding or press molding.

The heating temperature at the time of molding is preferably from 120 to 220° C., more preferably from 130 to 200° C., most preferably from 130 to 170° C. The heating time for molding is preferably from 10 to 40 minutes, more preferably from 15 to 30 minutes.

By heating at a high temperature at the time of molding, cross-linking will proceed at the same time as the molding. However, at the above temperature, it is often required to take a long time for sufficient cross-linking, and therefore, it is preferred that after heating for a short time for molding, the obtained crosslinked product of the fluorinated elastomer composition (hereinafter referred to as the primary crosslinked product), is further heated in e.g. an oven using electricity, hot air, steam or the like as the heat source to let crosslinking proceed (hereinafter referred to as secondary crosslinking). By carrying out the secondary crosslinking, crosslinking of the crosslinked product will sufficiently proceed, and the residue of the organic peroxide contained in the crosslinked product will be decomposed and volatilized, whereby its amount will be reduced.

The heating temperature at the time of secondary crosslinking is preferably from 150 to 280° C., more preferably from 180 to 260° C., further preferably from 200 to 250° C. The heating time in the secondary crosslinking is preferably from 1 to 48 hours, more preferably from 2 to 24 hours.

The crosslinked product obtained from the crosslinkable fluorinated elastomer composition of the present invention, is excellent in mechanical properties, chemical resistance, heat resistance, etc.

EXAMPLES

Now, the present invention will be described specifically with reference to Examples, but it should be understood that the present invention is by no means limited to these Examples. Here, the respective measurement items were measured by the following methods.

[Copolymerization Composition of Fluorinated Elastomer, and Identification of Fluorinated Aromatic Compound]

With respect to a fluorinated elastomer and a fluorinated aromatic compound, measurements of $^1$H-NMR and $^{19}$F-NMR were conducted by means of FT-NMR apparatus JNM-AL300, manufactured by JEOL Ltd. (JEOL), and from the results, determination of the copolymerization composition and identification of the fluorinated aromatic compound were carried out.

[Method for Measuring Storage Modulus G' of Fluorinated Elastomer]

A value measured at a temperature of 100° C. with an amplitude of 0.5 degrees at a vibration frequency of 50 times/min. in accordance with ASTM D5289 and D6204, by using RPA2000 manufactured by Alpha Technologies Inc., was taken as the storage modulus G'.

[Iodine Atom Content]

2 mg of a fluorinated elastomer was burned, and the generated gas was absorbed by a 0.02 mass % hydrazine aqueous solution, whereupon the obtained solution was analyzed by an ICP emission method to measure the content of iodine atoms in the solution, and from the results, the content of iodine atoms in the fluorinated elastomer was determined.

[Glass Transition Temperature (Tg)]

The glass transition temperature (Tg) of the fluorinated aromatic compound (A-1) was measured by DSC Q-100 manufactured by TA Instruments. The measurement was conducted under such a condition that the temperature was raised to 135° C. at a heating rate of 10° C./min, then cooled at a cooling rate of 20° C./min, and raised again to 135° C. at a heating rate of 10° C./min, and the temperature at the inflection point in the obtained DSC curve was taken as Tg.

[Melting Point (Tm)]

The melting points (Tm) of the fluorinated aromatic compounds (A-1) and (A-2) were measured by DSC Q-100 manufactured by TA Instruments. The measurement was conducted under such a condition that the temperature was raised to 135° C. at a heating rate of 10° C./min, then cooled at a cooling rate of 20° C./min, and raised again to 135° C. at a heating rate of 10° C./min, and the temperature at the peak top of the endothermic peak in the obtained DSC curve was taken as Tm. Here, in a case where a plurality of Tm were observed, they were identified as $Tm_1$, $Tm_2$, $Tm_3$, etc. from the lower side. The reason as to why a plurality of Tm are observed, is considered to be such that a plurality of crystalline states exist.

[Heat Resistance Test]

A sample (a crosslinked product of a crosslinkable fluorinated elastomer composition having a size of 10 mm×30 mm and a thickness of 1 mm) for a heat resistance test was heated in a hot air oven at a predetermined temperature for a predetermined time and then taken out and visually observed, whereby the heat resistance in the heat resistance test at a predetermined temperature for a predetermined time, was evaluated by the following standards.

○ (good): The sample did not deform.

X (bad): The sample deformed.

The heat resistance test was conducted by starting from the shortest heating time at 300° C. among conditions of 300° C.×48 hours, 300° C.×72 hours, 325° C.×24 hours, 325° C.×48 hours and 325° C.×72 hours, and when the evaluation became "x", no further heat resistance test under a longer time or higher temperature condition was carried out.

[Chemical Resistance Test]

In a sample bottle, a sample (a crosslinked product of a crosslinkable fluorinated elastomer composition having a size of 13 mm×13 mm and a thickness of 1 mm) for a chemical resistance test was immersed in a 48% NaOH aqueous solution and in N,N-dimethylacetamide (hereinafter referred to as DMAc), respectively, and maintained at 40° C. for 180 hours, whereupon it was taken out and visually observed to evaluate the chemical resistance by the following standards.

○ (good): None of coloration, swelling and shrinkage was observed in the sample.

X (bad): A change in any of coloration, swelling and shrinkage was observed in the sample.

[Tensile Strength, Elongation]

A crosslinkable fluorinated elastomer composition was heated and molded under a condition of 130° C.×20 min to obtain a sheet-form primary crosslinked rubber article having a thickness of 1 mm. Then, secondary crosslinking was conducted under a condition of 250° C.×4 hours to obtain a crosslinked rubber article. In accordance with JIS K6251 (2004), a sample of the obtained crosslinked rubber article was punched in a shape of No. 4 dumbbell to obtain a test piece, which was subjected to a tensile test at room temperature by means of a tester (product name: Quick leader) manufactured by Ueshima Seisakusho Co., Ltd. to measure the breaking strength and the elongation at break.

[Hardness]

In accordance with JIS K6253 (1997), and using a durometer type A at 23° C., six sheets of sheet-shaped crosslinked rubber article having a thickness of 1 mm were overlaid, and the hardness was measured.

[Heat Aging Resistance Test]

In accordance with JIS K6257 (2003), after thermal aging under a condition of 270° C.×168 hr, the change in hardness, the change in tensile strength and the change in elongation were measured.

[Compression Set Test]

In accordance with JIS K6262 (1997), an O-ring of P26 size as a sample was compressed at a compression ratio of 25% under a condition of 270° C.×168 hr, whereupon the compression set was measured.

[Mold Releasability]

A sheet having a size of 100 mm×60 mm×1 mmt was molded under a condition of 130° C.×20 min, and then removed from the mold by pulling a corner of the sheet by hand, whereby whether or not cut and chipping occurred in the part of the molded article was determined by visual observation.

A case where cut or chipping did not occur, was judged to be ○ (good), and a case where cut or chipping occurred, was judged to be x (bad).

Synthesis Example 1: Synthesis of Fluorinated Elastomer (F1) with Iodine Terminal Into a stainless steel pressure resistant reactor having an inner volume of 20 L and equipped with an anchor type stirring blade, 8,770 g of deaerated ion exchanged water, 733 g of $CF_3CF_2OCF_2CF_2OCF_2COONH_4$, 15.9 g of disodium hydrogen phosphate 12 hydrate and 18.0 g of $CF_2$=CFO$(CF_2)_4$OCF=$CF_2$ (hereinafter referred to as C4DVE) were charged, and the gas phase was replaced with nitrogen. With stirring at a rotation speed of 375 rpm, 554 g of $CF_2$=CFO—$CF_3$ (hereinafter referred to as PMVE) and 115 g of TFE were charged, and the inner temperature was raised to 80° C. The internal pressure was 0.90 MPaG (G means gauge pressure). 40 mL of a 2.5 mass % aqueous solution of ammonium persulfate was added to initiate the polymerization.

As the internal pressure of the reactor decreases along with the progress of the polymerization, at the time when the internal pressure dropped to 0.89 MPaG, TFE gas was injected to raise the internal pressure to 0.91 MPaG. This operation was repeated to maintain the internal pressure of the reactor to be from 0.89 to 0.91 MPaG thereby to continue the polymerization reaction. When the amount of TFE added became 30 g, 16.0 g of 1,4-diiodoperfluorobutane was added by nitrogen back pressure. Subsequently, every time when 80 g of TFE was added, 80.0 g of PMVE was added by nitrogen back pressure. Injection of PMVE was continued until 800 g of TFE was added. The total amount of PMVE added from the initiation to the end of the polymerization was 635 g.

When the total amount of TFE added after addition of the aqueous ammonium persulfate solution became 800 g, the addition of TFE was terminated, and the inner temperature of the reactor was cooled to 10° C. to terminate the polymerization reaction. 6,530 g of a latex of the fluorinated elastomer (F1) with iodine terminal was obtained. The polymerization time was 9 hours. The solid content concentration in the latex was 20 mass %.

While stirring 5,000 g of the latex, 50 g of 96% sulfuric acid was added to the latex to coagulate the fluorinated elastomer (F1). The coagulate was separated and washed 10 times with 5,000 g ultrapure water each time. Vacuum drying was conducted at 50° C. for 12 hours to obtain a white fluorinated elastomer (F1).

The copolymerization composition of the fluorinated elastomer (F1) was structural units based on TFE/structural units based on PMVE/structural units based on C4DVE=76/24/0.10 (molar ratio), and the signal based on the polymerizable double bonds derived C4DVE was not observed. Thus, it is considered that the vinyl group of C4DVE was all consumed during the polymerization, so that no vinyl group was present in the fluorinated elastomer (F1).

The content of iodine atoms in the fluorinated elastomer (F1) was 18.8 μmol/g. Further, the storage modulus G' was 495 kPa.

Synthesis Example 2: Synthesis of Fluorinated Aromatic Compound (B1)

Into a 0.5 L four-necked glass flask equipped with a Dimroth condenser, a thermocouple thermometer and a mechanical stirrer, perfluorobiphenyl (22.5 g), 1,3,5-trihydroxybenzene (3.7 g) and DMAc (149 g) were charged. While stirring and heating on an oil bath, when the liquid temperature reached 40° C., potassium carbonate (18 g) was quickly added. The mixture was heated at 40° C. for 16 hours with continued stirring. Thereafter, the reaction solution was cooled to room temperature and slowly dropwise added into about 1 L of vigorously stirred 0.5N hydrochloric acid, to perform reprecipitation. After filtration, further washing twice with pure water was followed by vacuum drying at 70° C. for 12 hours to obtain a white powdery fluorinated aromatic compound β (16 g). The number average molecular weight of the fluorinated aromatic compound β was 5,021, and the weight average molecular weight was 27,817.

Into a 0.5 L four-necked glass flask equipped with a Dimroth condenser, a thermocouple thermometer and a mechanical stirrer, the fluorinated aromatic compound β obtained as described above (11.3 g), 4-acetoxystyrene (5.9 g) and diethylene glycol dimethyl ether (154 g) were charged. Further, while stirring at room temperature, a 48% aqueous potassium hydroxide solution (5.3 g) was charged and stirred at room temperature for 20 hours. Then, the reaction solution was gradually dropwise added to about 1 L of vigorously stirred 0.5N hydrochloric acid, to perform reprecipitation. After filtration, further washing twice with pure water was followed by vacuum drying at 70° C. for 12 hours to obtain a white powdery fluorinated aromatic compound (B1) (10 g).

The obtained fluorinate aromatic compound (B1) was confirmed to have a styryl group, by NMR. The number average molecular weight of the fluorinate aromatic compound (B1) was 5,720, and the mass average molecular weight was 31,278.

Synthesis Example 3: Synthesis of Fluorinated Aromatic Compound (A-1)

Into a 2 L four-neck flask equipped with a three-way cock for introducing nitrogen and a thermocouple thermometer,
82.2 g of perfluorobiphenyl and 98.4 g of p-acetoxystyrene were put and dissolved in 708.9 g of DMAc, and then, 140.0 g of a 48% aqueous potassium hydroxide solution was added and stirred for a reaction. The temperature of the reaction solution was controlled within a range of from 8 to 9° C., and the reaction was continued for 24 hours. Then, the reaction crude liquid was dropped in 3,090 g of 0.5N hydrochloric acid, whereby a white solid precipitated. The obtained solid was collected by filtration and washed twice with ion-exchanged water to obtain 122 g (yield: 92.8%) of a fluorinated aromatic compound (A-1) as white solid.

With respect to the obtained fluorinated aromatic compound (A-1), analyses by NMR and DSC were conducted. The results are shown below.

$^1$H-NMR, $^{19}$F-NMR Spectra:

$^1$H-NMR (300.4 MHz, solvent: deuterated acetone, standard: tetramethylsilane (TMS), internal standard: bis(trifluoromethyl)benzene) δ (ppm): 7.55, 7.20, 6.75, 5.80, 5.25.

$^{19}$F-NMR (282.7 MHz, solvent: deuterated acetone, standard: CFCl$_3$, internal standard: bis(trifluoromethyl)benzene) δ (ppm): −140.0, −155.5.

From the above results, the fluorinated aromatic compound (A-1) was confirmed to have the following structure.

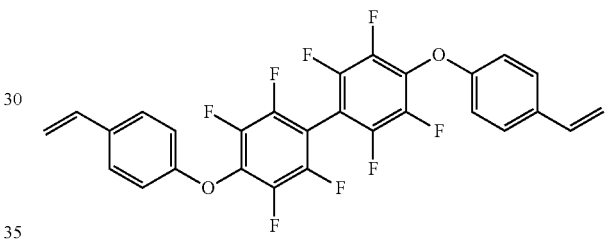

Synthesis Example 4: Synthesis of Fluorinated Aromatic Compound (A-2)

Into a 1 L four-necked flask equipped with a three-way cock for introducing nitrogen and a thermocouple thermometer, 25.0 g of perfluorotoluene and 68.7 g of p-acetoxystyrene were put and dissolved in 385.0 g of diglyme, and then, 102.5 g of a 48% aqueous sodium hydroxide solution was added and stirred for a reaction. The temperature of the reaction solution was controlled at 60° C., and the reaction was continued for 6 hours. Then, the reaction crude liquid was dropped in 1,744 g of 0.5N hydrochloric acid, whereby a white solid precipitated. The obtained solid was collected by filtration and washed twice with ion-exchanged water, to obtain 30.1 g (yield: 53.0%) of a fluorinated aromatic compound (A-2) as white solid.

With respect to the obtained fluorinated aromatic compound (A-2), analyses by NMR and DSC were conducted. The results are shown below.

$^1$H-NMR, $^{19}$F-NMR Spectra:

$^1$H-NMR (300.4 MHz, solvent: acetone, standard: TMS, internal standard: bis(trifluoromethyl)benzene) δ (ppm): 7.50, 7.15, 6.75, 5.75, 5.20.

$^{19}$F-NMR (282.7 MHz, solvent: deuterated acetone, standard: CFCl$_3$, internal standard: bis(trifluoromethyl)benzene) δ (ppm): −56.7, −142.0.

Tg=−0.4° C., Tm$_1$=122.1° C., Tm$_2$=130.2° C.

From the above results, the fluorinated aromatic compound (A-2) was confirmed to have the following structure.

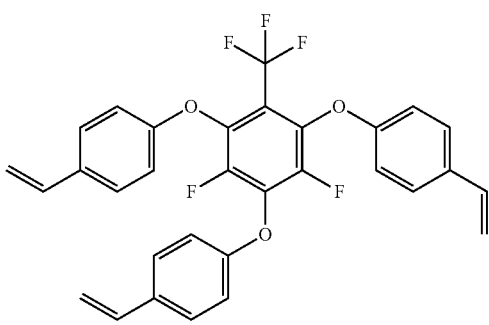 [SMILES: C=Cc1ccc(Oc2c(F)c(Oc3ccc(C=C)cc3)c(C(F)(F)F)c(Oc3ccc(C=C)cc3)c2F)cc1]

Example 1

1.01 g of the fluorinated elastomer (F1), 0.104 g of the fluorinated aromatic compound (A-1), 20.0 g 1H-tridecafluorohexane (AC-2000 manufactured by Asahi Glass Company, Limited; hereinafter referred to as AC-2000), 0.0306 g of magnesium oxide, and 0.0203 g of 2,5-dimethyl-2,5-di(t-butylperoxy)hexane (PERHEXA 25B manufactured by NOF Corporation; hereinafter referred to as PERHEXA 25B) were mixed and stirred in a 50 mL eggplant flask to obtain a dispersion of a cross-linkable fluorinated elastomer composition.

This dispersion was cast on a sheet of polytetrafluoroethylene (hereinafter referred to as PTFE), and the solvent was removed by nitrogen flow, followed by heat pressing between stainless steel plates at 170° C. for 12 minutes, to prepare a film with a thickness of 1 mm (a crosslinked product of the crosslinkable fluorinated elastomer composition).

The obtained film was cut into 10 mm×30 mm to prepare a sample for the heat resistance test, and the heat resistance test was conducted at the temperature and time shown in Table 1. The results are shown in Table 1.

Further, the obtained film was cut into 13 mm×13 mm to prepare a sample for the chemical resistance test, and the chemical resistance test was conducted. The results are shown in Table 1.

Example 2

In the same manner as in Example 1 except that magnesium oxide was not blended, a dispersion of the crosslinked fluorinated elastomer composition was prepared and a film with a thickness of 1 mm was prepared. From the film, samples for the heat resistance test and the chemical resistance test were prepared, and the heat resistance test and the chemical resistance test were conducted. The results are shown in Table 1.

Example 3

In the same manner as in Example 1 except that 1.01 g of the fluorinated elastomer (F1), 0.105 g of the fluorinated aromatic compound (A-2), 20.3 g of AC-2000, 0.0318 g of magnesium oxide and 0.0165 g of PERHEXA 25B were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 1.

Example 4

In the same manner as in Example 3 except that magnesium oxide was not blended, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 1.

Example 5

In the same manner as in Example 1 except that 1.02 g of the fluorinated elastomer (F1), 0.0950 g of the fluorinated aromatic compound (B1), 20.2 g of AC-2000, 0.0321 g of magnesium oxide and 0.0200 g of PERHEXA 25B were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 1.

Example 6

In the same manner as in Example 5 except that magnesium oxide was not blended, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 1.

Example 7

In the same manner as in Example 1 except that 1.00 g of the fluorinated elastomer (F1), 0.1010 g of divinylbenzene, 20.5 g of AC-2000, 0.0313 g of magnesium oxide, and 0.0188 g of PERHEXA 25B were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 1.

Example 8

In the same manner as in Example 7 except that magnesium oxide was not blended, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 1.

Comparative Example 1

In the same manner as in Example 1 except that 1.02 g of the crosslinked fluorinated elastomer (F1), 0.104 g of triallyl isocyanurate (hereinafter referred to as TAIC), 20.2 g of AC-2000, 0.0298 g of magnesium oxide, and 0.0180 g of PERHEXA 25B were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 1.

Comparative Example 2

In the same manner as in Example 1 except that 1.00 g of the crosslinked fluorinated elastomer (F1), 0.104 g of 1,6-divinylperfluorohexane, 20.6 g of AC-2000, 0.0310 g of magnesium oxide, and 0.0185 g of PERHEXA 25B were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 1.

TABLE 1

| | | Examples | | | | | | | | Comparative Examples | |
|---|---|---|---|---|---|---|---|---|---|---|---|
| | | 1 | 2 | 3 | 4 | 5 | 6 | 7 | 8 | 1 | 2 |
| Heat resistance | 300° C. × 48 hr | O | O | O | O | O | O | O | O | O | O |
| | 300° C. × 72 hr | O | O | O | O | O | O | X | X | X | O |
| | 325° C. × 24 hr | O | O | X | X | O | O | — | — | — | X |
| | 325° C. × 48 hr | O | O | — | — | O | O | — | — | — | — |
| | 325° C. × 72 hr | O | X | — | — | O | O | — | — | — | — |
| Chemical resistance | 48% NaOH aqueous solution | O | O | O | O | O | O | O | O | O | O |
| | DMAc | O | O | O | O | O | O | O | O | O | X |

In the crosslinked products of the crosslinkable fluorinate elastomer compositions in Examples 1 to 6, no deformation was observed at all in the heat resistance test at 300° C. for 72 hours, and thus, they were excellent in heat resistance. Particularly in the crosslinked products of the crosslinkable fluorinated elastomer compositions in Examples 1 to 2 and 5 to 6, no deformation was observed at all even in the heat resistance test at 325° C. for 48 hours. Further, the crosslinked products of the crosslinkable fluorinated elastomer compositions in Examples 1 to 6, showed no coloration, swelling or shrinkage in the chemical resistance test using the 48% NaOH aqueous solution or DMAc, and thus, they were excellent in chemical resistance.

On the other hand, in the crosslinked product of the crosslinkable fluorinated elastomer composition in Comparative Example 1 wherein, instead of the aromatic compound having at least two crosslinkable unsaturated double bonds, TAIC having three allyl groups as a hydrocarbon having a large content of crosslinkable groups per unit mass, which is thus considered to have higher crosslinkability, was used, a large deformation was observed in the heat resistance test at 300° C. for 72 hours, and thus, it was not sufficient in heat resistance as compared with the present invention. This is considered to be attributable to the low heat resistance of TAIC itself.

Here, the aromatic hydrocarbon (C) used in Examples 7 and 8, has a smaller content of crosslinkable groups per unit mass than TAIC used in Comparative Example 1, and nevertheless, the heat resistance of the obtained crosslinked product was equal to the case of using TAIC. Thus, it has been confirmed that the aromatic hydrocarbon (C) is superior to TAIC in the effect of improving the crosslinking reaction, and it is possible to improve the crosslinking reactivity of the crosslinkable fluorinated elastomer composition with a smaller amount. Further, the crosslinked products obtained in Examples 7 and 8 were excellent also in chemical resistance. Heretofore, it has not been known at all that it is possible to obtain a crosslinked product of a fluorinated elastomer composition having a high chemical resistance by using the aromatic hydrocarbon (C).

Further, the crosslinked product of the crosslinkable fluorinated elastomer composition in Comparative Example 2 using 1,6-divinylperfluorohexane in place of the aromatic compound having at least two crosslinkable unsaturated double bonds, was soluble in DMAc, and its volume was contracted. Thus, with this crosslinking agent, the crosslinked product was found to be inferior in chemical resistance.

Example 9

To 100 g of the fluorinated elastomer (F1), 10 g of the fluorinated aromatic compound (A-1), 0.5 g of TAIC (TAIC-WH60; powder type having 60% of TAIC impregnated to white carbon, hereinafter referred to as TAIC-WH60), 3 g of magnesium oxide (MgO #150; highly active magnesium oxide manufactured by Kyowa Chemical Industry Co., product name: Mag 150), 2 g of t-butyl peroxybenzoate (product name: Kayabutyl B, manufactured by Kayaku Akzo Corporation, hereinafter referred to as Kayabutyl B), 5 g of carbon black (MT carbon; carbon black manufactured by Cancarb, product name: Thermax N990, hereinafter referred to as MT-C), and 1 g of sodium stearate, were kneaded by a two roll mill, to obtain a crosslinkable fluorinated elastomer composition. This crosslinkable fluorinated elastomer composition was heat-pressed at 130° C. for 40 minutes, and then subjected to secondary crosslinking at 250° C. for 4 hours, to prepare a film having a thickness of 1 mm. From the film, samples for the heat resistance test and the chemical resistance test were prepared, and the heat resistance test and the chemical resistance test were conducted. The results are shown in Table 2.

Examples 10 to 14

In the same manner as in Example 9 except that the blending amounts of the fluorinated compound (A-1), TAIC-WH60 and other additives, were changed to the values shown in Table 2, a test piece of the crosslinked rubber article was obtained, and the heat resistance test and the chemical resistant test were conducted. The results are shown in Table 2.

Comparative Example 3

To 100 g of the fluorinated elastomer (F1), 3 g of TAIC-WH60, 1.3 g of Kayabutyl B, 15 g of the MT-C and 1 g of sodium stearate were kneaded by a two roll mill, to obtain a crosslinkable fluorinated elastomer composition. This crosslinkable fluorinated elastomer composition was heat-pressed at 130° C. for 40 minute, and then subjected to secondary crosslinking at 250° C. for 4 hours, to prepare a crosslinked rubber article having a thickness of 1 mm. From the crosslinked rubber article, samples for the heat resistance test and the chemical resistance test were prepared, and the heat resistance test and the chemical resistance test were conducted. The results are shown in Table 2.

TABLE 2

| | Example No. | | | | | | |
|---|---|---|---|---|---|---|---|
| | Ex. 9 | Ex. 10 | Ex. 11 | Ex. 12 | Ex. 13 | Ex. 14 | Comp. Ex. 3 |
| Fluorinated elastomer (F1) | 100 | 100 | 100 | 100 | 100 | 100 | 100 |
| Fluorinated aromatic compound (A-1) | 10 | 10 | 10 | 7.5 | 7.5 | 5 | — |
| MgO #150 | 3 | 3 | 3 | 2.25 | 2.25 | 1.5 | — |
| MT-C | 5 | 5 | 5 | 5 | 5 | 5 | 15 |
| Kayabutyl B | 2 | 2 | 2 | 1.5 | 1.5 | 1 | 1.3 |
| PERHEXA 25B | — | — | — | — | — | — | — |
| TAIC-WH60 | 0.5 | 0.3 | 0.7 | 0.5 | 0.3 | 0.3 | 3 |
| Sodium stearate | 1 | 1 | 1 | 1 | 1 | 1 | 1 |
| Total kneaded amount | 121.5 | 121.3 | 121.7 | 117.75 | 117.55 | 113.8 | 120.3 |
| (Numerical values in the above Table represent mass parts) | | | | | | | |
| Normal state physical properties | | | | | | | |
| (measured by No. 4 dumbbell with t = 1 mm) | | | | | | | |
| Hardness | 76 | 76 | 76 | 71 | 72 | 68 | 76 |
| Tensile strength (MPa) | 13.7 | 12.8 | 12.7 | 14.4 | 14.2 | 17.9 | 18.4 |
| 100% modulus (MPa) | 10.3 | 9.9 | 10.1 | 8.1 | 7.4 | 5.0 | 8.0 |
| Elongation (%) | 130 | 126 | 120 | 150 | 156 | 190 | 185 |
| Physical properties after aging test (270° C. × 168 hr) | | | | | | | |
| Hardness | 72 | 72 | 73 | 69 | 69 | 67 | 74 |
| Tensile strength (MPa) | 12.5 | 12.5 | 11.1 | 11.8 | 12.9 | 14.2 | 5.8 |
| Elongation (%) | 276 | 275 | 277 | 296 | 308 | 306 | 607 |
| Change in hardness (Point) | −4 | −4 | −3 | −2 | −3 | −1 | −2 |
| Change in tensile strength (%) | −8.8 | −2.5 | −13.0 | −18.1 | −8.7 | −20.7 | −68.6 |
| Change in elongation (%) | 112 | 118 | 131 | 97 | 97 | 61 | 228 |
| Compression set (P26 O-ring) | | | | | | | |
| Compression set by 25% compression (270° C. × 70 hr) | 57.4 | 60.5 | 58.0 | 58.2 | 63.6 | 67.3 | 86.5 |
| Mold releasability | ◯ | ◯ | ◯ | ◯ | ◯ | ◯ | ◯ |
| Chemical resistance (40° C. × 180 hr) | | | | | | | |
| 48% NaOH aqueous solution | ◯ | ◯ | ◯ | ◯ | ◯ | ◯ | ◯ |
| DMAc | ◯ | ◯ | ◯ | ◯ | ◯ | ◯ | ◯ |

Example 15

In the same manner as in Example 1 except that 1.51 g of the fluorinated elastomer (F1), 0.152 g of the fluorinated aromatic compound (A-2), 0.0101 g of TAIC-WH60, 24.8 g of AC-2000, 0.0450 g of magnesium oxide and 0.0273 g of PERHEXA 25B, were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 3.

Example 16

In the same manner as in Example 1 except that 1.51 g of the fluorinated elastomer (F1), 0.149 g of the fluorinated aromatic compound (B1), 0.0100 g of TAIC-WH60, 24.9 g of AC-2000, 0.0443 g of magnesium oxide and 0.0298 g of PERHEXA 25B, were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 3.

Example 17

In the same manner as in Example 1 except that 1.50 g of the fluorinated elastomer (F1), 0.120 g of divinylbenzene, 0.00571 g of TAIC-WH60, 24.8 g of AC-2000, and 0.0266 g of PERHEXA 25B were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 3.

Comparative Example 4

In the same manner as in Example 1 except that 1.51 g of the crosslinked fluorinated elastomer (F1), 0.160 g of 1,6-divinylperfluorohexane, 0.0103 g of TAIC-WH60, 25.10 g of AC-2000 and 0.0293 g of PERHEXA 25B were used, a dispersion of the crosslinked fluorinated elastomer composition was prepared, and a film with a thickness of 1 mm was prepared. From the film, samples for the heat resistance test and the chemical resistance test were prepared, and the heat resistance test and the chemical resistance test were conducted. The results are shown in Table 3.

TABLE 3

| | | Examples | | | Comparative Examples |
|---|---|---|---|---|---|
| | | Ex. 15 | Ex. 16 | Ex. 17 | Comp. Ex. 4 |
| Heat resistance | 300° C. × 48 hr | ◯ | ◯ | ◯ | ◯ |
| | 300° C. × 72 hr | ◯ | ◯ | ◯ | ◯ |
| | 325° C. × 24 hr | ◯ | ◯ | X | X |
| | 325° C. × 48 hr | X | ◯ | — | — |
| | 325° C. × 72 hr | — | ◯ | — | — |

TABLE 3-continued

|  |  | Examples | | | Comparative Examples |
|---|---|---|---|---|---|
|  |  | Ex. 15 | Ex. 16 | Ex. 17 | Comp. Ex. 4 |
| Chemical resistance | 48% NaOH aqueous solution | ○ | ○ | ○ | ○ |
|  | DMAc | ○ | ○ | ○ | X |

Example 18

To 100 g of the fluorinated elastomer (F1), 5 g of the fluorinated aromatic compound (A-1), 0.3 g of TAIC-WH60, 1.5 g of MgO #150, 1 g of Kayabutyl B, 10 g of dry silica (product name: AEROSIL R8200 manufactured by Nippon Aerosil Co., Ltd. hereinafter referred to as R8200) and 1 g of sodium stearate were kneaded by a twin roll mill to obtain a crosslinkable fluorinated elastomer composition. The crosslinkable fluorinated elastomer composition was heat-pressed at 130° C. for 40 minutes, and then subjected to secondary crosslinking at 250° C. for 4 hours, to prepare a film having a thickness of 1 mm. From the film, samples for the heat resistance test and the chemical resistance test were prepared, and the heat resistance test and the chemical resistance test were conducted. The results are shown in Table 4.

Example 19

To 100 g of the fluorinated elastomer (F1), 3 g of the fluorinated aromatic compound (A-1), 3 g of TAIC-WH60, 1.5 g of MgO #150, 1 g of PERHEXA 25B, 5 g of MT-C and 1 g of sodium stearate were kneaded by a twin roll mill to obtain a crosslinkable fluorinated elastomer composition. The crosslinkable fluorinated elastomer composition was heat-pressed at 130° C. for 40 minutes, and then subjected to secondary crosslinking at 250° C. for 4 hours, to prepare a film having a thickness of 1 mm. From the film, samples for the heat resistance test and the chemical resistance test were prepared, and the heat resistance test and the chemical resistance test were conducted. The results are shown in Table 4.

Example 20

To 100 g of the fluorinated elastomer (F1), 4 g of the fluorinated aromatic compound (A-1), 1 g of the fluorinated aromatic compound (A-2), 0.3 g of TAIC-WH60, 1 g of PERHEXA 25B, 5 g of MT-C and 1 g of sodium stearate were kneaded by a twin roll mill to obtain a crosslinkable fluorinated elastomer composition. The crosslinkable fluorinated elastomer composition was heat-pressed at 130° C. for 40 minutes, and then subjected to secondary crosslinking at 250° C. for 4 hours, to prepare a film having a thickness of 1 mm. From the film, samples for the heat resistance test and the chemical resistance test were prepared, and the heat resistance test and the chemical resistance test were conducted. The results are shown in Table 4.

TABLE 4

| Example No. | Ex. 18 | Ex. 19 | Ex. 20 |
|---|---|---|---|
| Fluorinated elastomer (F1) | 100 | 100 | 100 |
| Fluorinated aromatic compound (A-1) | 5 | 3 | 4 |
| Fluorinated aromatic compound (A-2) | — | — | 1 |
| MgO #150 | 1.5 | 1.5 | — |
| MT-C | — | 5 | 5 |
| R8200 (dry silica) | 10 | — | — |
| Kayabutyl B | 1 | — | — |
| PERHEXA 25B | — | 1 | 1 |
| TAIC-WH60 | 0.3 | 3 | 0.3 |
| Sodium stearate | 1 | 1 | 1 |
| Total kneaded amount | 118.8 | 114.5 | 112.3 |
| (Numerical values in the above Table represent mass parts) | | | |
| Normal state physical properties (measured by No. 4 dumbbell with t = 1 mm) | | | |
| Hardness | 76 | 70 | 68 |
| Tensile strength (MPa) | 21.6 | 22.2 | 19.6 |
| 100% modulus (MPa) | 7.4 | 7.2 | 5.9 |
| Elongation (%) | 197 | 186 | 178 |
| Physical properties after aging test (270° C. × 168 hr) | | | |
| Hardness | 76 | 70 | 66 |
| Tensile strength (MPa) | 20.8 | 17.0 | 17.3 |
| Elongation (%) | 269 | 305 | 349 |
| Change in hardness (Point) | 0 | 0 | −2 |
| Change in tensile strength (%) | −3.7 | −23.4 | −11.7 |
| Change in elongation (%) | 37 | 64 | 96 |
| Compression set (P26 O-ring) | | | |
| Compression set by 25% compression (270° C. × 70 hr) | 67.1 | 44.6 | 62.3 |
| Mold releasability | ○ | ○ | ○ |
| Chemical resistance (40° C. × 180 hr) | | | |
| 48% NaOH aqueous solution | ○ | ○ | ○ |
| DMAc | ○ | ○ | ○ |

From the compression set in Table 2, it has been confirmed that when TAIC is used in combination with an aromatic compound having at least two crosslinkable unsaturated double bonds, as compared with a case of using TAIC alone, it is possible to obtain a cross-linked product of a fluorinated elastomer composition having excellent properties.

Further, from Table 3, it has been confirmed that when TAIC is used in combination with an aromatic compound having at least two crosslinkable unsaturated double bonds, as compared with a case of using the aromatic compound alone, it is possible to obtain a cross-linked product having more excellent characteristics. This effect is not seen in a compound having no crosslinkable unsaturated double bonds bonded directly to an aromatic ring as in Comparative Example 4.

From Table 4, it has been confirmed that the composition having R8200 added, is superior in tensile strength to the composition having MT-C added (Example 18). Further, it has been confirmed that when the mass ratio of the aromatic compound having at least two crosslinkable unsaturated double bonds/the crosslinking aid other than the aromatic compound is 1/1, the value of the compression set is small, and deformation due to heat is less likely to occur (Example 19). In addition, it has been confirmed that with a composition obtained by adding at least two types of aromatic compounds having at least two crosslinkable unsaturated double bonds, the value of the compression set is small, and deformation due to heat is less likely to occur (Example 20).

INDUSTRIAL APPLICABILITY

The crosslinkable fluorinated elastomer composition of the present invention is useful for applications to e.g. rubbers, resins, coating agents, paints, sealing materials, etc.

The crosslinked product of the crosslinkable fluorinated elastomer composition of the present invention is useful as various rubber products and plastic products in a wide range of fields including transport equipment (automobiles, etc.), general machinery, electrical equipment, semiconductor manufacturing equipment, chemical plant equipment, etc.

As the rubber products, sealing materials (O-rings, sheets, gaskets, oil seals, bearing seals, etc.), diaphragms, cushioning materials, vibration-proof materials, wire coating materials, industrial belts, tubes, hoses, sheets, etc. may be mentioned.

In addition to the above, a sealing material for a light emitting element (LED, etc.), a power semiconductor encapsulating material, a circuit board insulation material, a sealing material, an adhesive, etc. may be mentioned.

What is claimed is:

1. A crosslinkable fluorinated elastomer composition, comprising a fluorinated elastomer and an aromatic compound having at least two crosslinkable unsaturated double bonds, wherein the aromatic compound having at least two crosslinkable unsaturated double bonds, comprises a fluorinated aromatic compound having at least two of group (1) represented by the following formula (1):

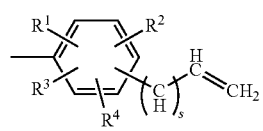

wherein s is 0 or 1, and each of $R^1$, $R^2$, $R^3$ and $R^4$ which are independent of one another, is a hydrogen atom or a fluorine atom, and the fluorinated aromatic compound having at least two of said group (1) comprises either one or both a fluorinated aromatic compound (A) represented by the following formula (A) and a fluorinated aromatic compound (B) having said group (1) and an ether bond, obtained by subjecting a fluorinated aromatic compound (x) represented by the following formula (x), either one or both of an aromatic compound (y1) having said group (1) and a phenolic hydroxy group and an aromatic compound (y2) having said group (1) and a fluorine atom substituting an aromatic ring, and an aromatic compound (z) having at least three phenolic hydroxy groups, to a condensation reaction in the presence of a HF elimination agent:

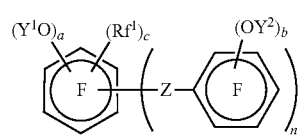

wherein, n is an integer of from 0 to 6, a is an integer from 0 to 5, b is an integer of from 0 to 4, c is an integer of from 0 to 4, a+c+n is from 2 to 6, a+b is from 2 to 9, Z is a single bond, —O—, —S—, —CO—, —C($CH_3$)$_2$—, —C($CF_3$)$_2$—, —SO— or —SO$_2$—, $Rf^1$ is a $C_{1-8}$ fluoroalkyl group, each of $Y^1$ and $Y^2$ which are independent of each other, is said group (1), and F in the aromatic ring represents that hydrogen atoms of the aromatic ring are all substituted by fluorine atoms,

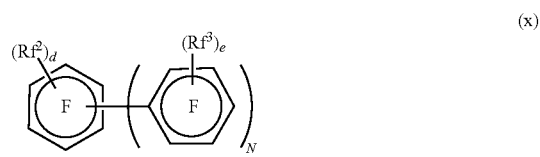

wherein N is an integer of from 0 to 3, each of d and e which are independent of each other, is an integer of from 0 to 3, each of $Rf^2$ and $Rf^3$ which are independent of each other, is a $C_{1-8}$ fluoroalkyl group, and F in the aromatic ring represents that hydrogen atoms of the aromatic ring are all substituted by fluorine atoms, wherein the content of the aromatic compound having at least two crosslinkable unsaturated double bonds, is from 0.1 to 15 mass % based on the mass of the fluorinated elastomer.

2. The crosslinkable fluorinated elastomer composition according to claim 1, wherein the aromatic compound having at least two crosslinkable unsaturated double bonds, has at least two vinyl groups or allyl groups bonded to an aromatic ring.

3. The crosslinkable fluorinated elastomer composition according to claim 1, wherein the aromatic compound having at least two crosslinkable unsaturated double bonds further comprises an aromatic hydrocarbon having at least two vinyl groups bonded to an aromatic ring.

4. The crosslinkable fluorinated elastomer composition according to claim 1, wherein the fluorinated aromatic compound (x) is at least one selected from the group consisting of perfluorobenzene, perfluorotoluene, perfluoroxylene, perfluorobiphenyl, perfluoroterphenyl, a perfluorotriphenyl benzene, a perfluorotetraphenyl benzene, a perfluoropentaphenyl benzene and a perfluorohexaphenylbenzene.

5. The crosslinkable fluorinated elastomer composition according to claim 1, wherein the aromatic compound (z) is at least one selected from the group consisting of trihydroxybenzene, trihydroxybiphenyl, trihydroxynaphthalene, 1,1,1-tris(4-hydroxyphenyl) ethane, tris(4-hydroxyphenyl) benzene, tetrahydroxybenzene, tetrahydroxybiphenyl, tetrahydroxybinaphthyl and a tetrahydroxyspiroindane.

6. The crosslinkable fluorinated elastomer composition according to claim 1, wherein the fluorinated aromatic compound (A) is one which satisfies both conditions that each of $R^1$, $R^2$, $R^3$ and $R^4$ in $Y^1$ and $Y^2$ in the formula (A) is a hydrogen atom, and that in the formula (A), c is 0, or c is an integer of from 1 to 4 and $Rf^1$ is a $C_{1-8}$ perfluoroalkyl group.

7. The crosslinkable fluorinated elastomer composition according to claim 6, wherein the fluorinated aromatic compound (A) is a compound represented by the following formula (A-1) or (A-2):

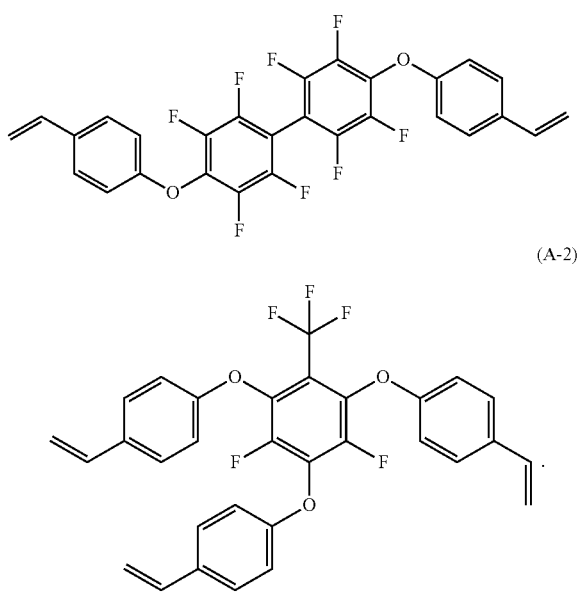

8. The crosslinkable fluorinated elastomer composition according to claim 1, further comprising an organic peroxide, and wherein the content of the organic peroxide is from 0.1 to 5 mass % based on the mass of the fluorinated elastomer.

9. The crosslinkable fluorinated elastomer composition according to claim 1, wherein the fluorinated elastomer comprises iodine and/or bromine atoms.

10. The crosslinkable fluorinated elastomer composition according to claim 1, wherein the fluorinated elastomer is a perfluoroelastomer.

11. The crosslinkable fluorinated elastomer composition according to claim 1, wherein the fluorinated elastomer is a tetrafluoroethylene/perfluoro(alkyl vinyl ether) copolymer having an iodine atom at a polymer chain terminal.

12. The crosslinkable fluorinated elastomer composition according to claim 1, further comprising a crosslinking aid other than the aromatic compound having at least two crosslinkable unsaturated double bonds, and wherein the content of the crosslinking aid is from 0.1 to 3 mass % based on the mass of the fluorinated elastomer.

13. The crosslinkable fluorinated elastomer composition according to claim 12, wherein the mass ratio of the aromatic compound having at least two crosslinkable unsaturated double bonds/the crosslinking aid other than the aromatic compound is from 1/30 to 150/1.

14. The crosslinkable fluorinated elastomer composition according to claim 12, wherein the crosslinking aid other than the aromatic compound having at least two crosslinkable unsaturated double bonds is triallyl isocyanurate.

15. A crosslinked product obtained by crosslinking the crosslinkable fluorinated elastomer composition according to claim 1.

* * * * *